United States Patent
Whitfield et al.

(10) Patent No.: US 10,541,597 B2
(45) Date of Patent: Jan. 21, 2020

(54) MAGNETIC GEARBOXES INCLUDING MAGNETIC GEARS ROTATABLE WITH SEQUENTIAL MAGNETIC LINKAGE BETWEEN THE MAGNETIC GEARS

(71) Applicants: George Winston Whitfield, St. Mary (JM); Howard Martin Chin, Kingston (JM)

(72) Inventors: George Winston Whitfield, St. Mary (JM); Howard Martin Chin, Kingston (JM)

(73) Assignees: George Winston Whitfield, St. Mary (JM); Howard Martin Chin, Kingston (JM); Peter Karl Melhado, Kingston (JM)

( * ) Notice: Subject to any disclaimer, the term of this patent is extended or adjusted under 35 U.S.C. 154(b) by 638 days.

(21) Appl. No.: 15/074,773

(22) Filed: Mar. 18, 2016

(65) Prior Publication Data

US 2017/0271970 A1 Sep. 21, 2017

(51) Int. Cl.
*H02K 49/00* (2006.01)
*H02K 49/10* (2006.01)

(52) U.S. Cl.
CPC .................. *H02K 49/102* (2013.01)

(58) Field of Classification Search
CPC ... H02K 49/106; H02K 49/108; H02K 49/102
See application file for complete search history.

(56) References Cited

U.S. PATENT DOCUMENTS

| 3,382,386 | A | 5/1968 | Schlaeppi |
| 6,084,326 | A * | 7/2000 | Nagai ................ F16H 25/2418 |
| | | | 310/103 |
| 7,105,968 | B2 | 9/2006 | Nissen |
| 8,403,916 | B2 | 3/2013 | Prescott |
| 2006/0091748 | A1 | 5/2006 | Yoda et al. |
| 2011/0266902 | A1 | 11/2011 | Whitfield et al. |
| 2012/0223606 | A1 | 9/2012 | Storaasli |

FOREIGN PATENT DOCUMENTS

| CH | 585865 A5 | 3/1977 |
| GB | 2157376 A | 10/1985 |
| JP | 57134066 A | 8/1982 |
| JP | 60014655 A | 1/1985 |
| JP | 61077595 A | 4/1986 |
| JP | 62234285 A | 10/1987 |
| JP | 09056146 A | 2/1997 |

(Continued)

OTHER PUBLICATIONS

Hatch, Gareth P., PhD, CEng FIMMM, "Recent Developments in Permanent Magnet Gear Systems & Machines," presented at Magnetics 2010 Conference, Lake Buena Vista, FL,Jan. 2010.

(Continued)

*Primary Examiner* — Dang D Le
(74) *Attorney, Agent, or Firm* — Walter | Haverfield LLP; D. Peter Hochberg; Sean F. Mellino

(57) ABSTRACT

A gearbox is described that includes a magnetic gear irrotationally mounted on one shaft and a set of gears on another shaft, wherein the one gear is in sequential magnetic interaction with the set of gears to alter to rotational speed of either the one gear or the set of gears.

13 Claims, 15 Drawing Sheets

(56) References Cited

FOREIGN PATENT DOCUMENTS

| JP | 09257116 A | 9/1997 |
| JP | 2005207564 | 8/2005 |
| WO | WO 96/22630 A1 | 7/1996 |

OTHER PUBLICATIONS

Pappalardo, Joe, "Changing Faces of Magnets," popularmechanics.com, Mar. 2010, p. 18.
Zhang, Yi, "Introduction to Mechanisms," www.cs.cmu.edu, Publication 39-245, Carnegie Mellon University.
"Gear Basics," Publication of the University of Warwick, Coventry, United Kingdom.
Second Office Action from the Chinese Patent Office dated Aug. 6, 2019 for corresponding Chinese Patent Application No. 201710167242.3.

* cited by examiner

MAGNETIC GEARBOXES INCLUDING MAGNETIC GEARS ROTATABLE WITH SEQUENTIAL MAGNETIC LINKAGE BETWEEN THE MAGNETIC GEARS

BACKGROUND OF THE INVENTION

Field of the Invention

This invention relates to magnetically coupled wheels (sometimes referred to as magnetic gears) and rotating objects, and in particular to a magnetically driven set of wheels or rotating objects or magnetic gears which are not to be physically engaged by the respective driving wheels or driving objects or magnetic gears and can operate at a spaced distance from the respective driving wheels or driving objects or magnetic gears, as well as operating other components operated by the driven wheels or driven rotating objects or magnetic gears, and to magnetic gearboxes.

Description of the Prior Art

Many devices function by having at least one rotating member for engagement with another member. The problem with such physical contact is that there is often the problem of jamming of the parts, the problem of deleterious particles and matter getting between the parts, loss of lubrication and the wearing down by friction. These known devices include geared transmissions and gearboxes containing gears. Propulsion systems are well known for extending through a hull or other wall, which require complex and expensive seals and stuffing boxes. Such systems sometimes utilize noxious fluids including lubricants and gases. Other such systems are not useable in dusty and gritty environments where the atmosphere contains deleterious components. There are also situations where angles of rotation of a pair of shafts with respect to each other must change during rotation of the shafts, where a relatively simple arrangement without a complex gearing structure would be most advantageous.

U.S. Patent Publication No. US 2011/0266902 A1 with common inventorship as the present application discloses a driving rotational object having magnet supporting surfaces with a series of adjacent magnets of opposite polarity, and a driven rotational object has a magnet supporting edge with adjacent magnets of opposite polarities. The driving rotational object passes its magnets through a first location and the driven rotational object passes its magnets through a second location spaced from the first location but where there is magnetic linkage within the region wherein the latter two magnets are located. The magnets of one polarity of the driving rotational object attract magnets of the opposite polarity of the driven rotational object to effect rotation of the driven rotational object. Disclosed as well are a pair of magnetic gears with peripherally located gears of alternating polarity where the rotational axes of the gears are not parallel. A gearbox is described for moving the relative axes of rotation of the respective gears to a desired angle, and for being a reducing gearbox if the driving magnetic gear is layer from the driven magnetic gear. A gear train is further disclosed having an outer hollow cylindrical gear and an internal cylindrical gear, each having peripheral magnets of alternating polarity. The outer and internal magnetic gears are spaced from each other by a small space, and either gear can be the driving magnetic gear and the other the driven magnetic gear. The driven magnetic gear rotates in response to the rotation of the driving magnetic gear as a result of the sequential magnetic attraction of the oppositely poled magnets. Further disclosed is a gearbox in the form of a ball joint assembly having a pair of magnetic gears having magnetically interacting magnets proximate each other which can be tilted relative to each other, but they cannot perpendicular to each other since rotation would not then be possible. A gearbox is also disclosed having a magnetic gear with an annular cylindrical configuration and another annular gear which is a toroidal ring with an annular depression, each magnetic gear having magnets of alternating polarities. The annular cylindrical gear is located in the annular depression, but the magnets of the respective magnetic gears are spaced from each other at their location of closest proximity. The latter magnetic gears are magnetically linked at their locations of closest proximity, with one of the magnetic gears being the driving gear and the other the driven gear.

The prior art does not include a teaching of magnetic gear transmission mechanisms or gearboxes or similar magnetic systems for changing and reversing the direction of rotation of a driven magnetic gear in a magnetic gear train.

SUMMARY OF THE INVENTION

It is an object of the present invention to provide apparatus for changing the direction of rotation of a set of rotating members without the use of toothed gears.

A yet additional object of the present invention is to provide apparatus for changing the orientation of rotating shafts during the rotation of the shafts by tilting the shafts relative to each other.

It is also a further object of the present invention to provide for the rotation of a driven member by a driving member which does not require the use of noxious or deleterious fluids for lubrication.

Additionally it is an object to provide a system having a driven rotating wheel rotated by a driving wheel which limits the torque between driving and driven wheels.

Another object of the present invention is the provision of a magnetic gear train wherein one of a set of cooperating magnetic gears is tiltable with respect to the rotation of the other magnetic gear without changing the rate of rotation.

It is an additional object of the present invention to provide a magnetic gear train wherein one of the magnetic gears is a driving magnetic gear to effect the rotation of the driven magnetic gear, wherein the driving magnetic gear is tiltable relative to the driven magnetic gear to effect a reversal of the direction of rotation of the driven magnetic gear.

It is also an object of the present invention to provide a gearbox for magnetic gears to reverse the direction of rotation without changing the magnetic properties of any magnetic gear forming part of the gearbox.

It is also a still further object of the present invention to provide a gearbox having shiftable magnetic gear shiftable in a linear direction such as a on a shaft, and at least two magnetic gears on a second shaft with sequential magnetic interaction between gears on the respective shafts for controlling the rotational speed of magnetic gears on one of the shafts.

Another object is a pair of magnetic gears having magnets of alternating polarities on the respective peripheries of the respective gears, with there being an unequally spaced number of magnets on the respective gears for varying the rotational speed of one of the magnetic gears.

These and other objects may occur to those skilled in the art from the description to follow and from the appended claims.

A preferred embodiment of the invention, which is incorporated in other embodiments of the invention, comprises a driving rotational component or magnetic gear having magnet supporting surface which supports a series of adjacent magnets of opposite polarity, the driving rotational component being adjacent to at least one driven rotational component and having a magnet supporting edge including a set of adjacent magnets having opposite polarities. An external motor torque rotates the driving rotational component. The driving rotational component passes its magnets having alternating polarities through a first location and the driven component passes its magnets having alternating polarities through a second location spaced from the first location, wherein the first and second locations are within a common region where the magnetic fields of those of the respective magnets of the driving rotational component and the driven rotational component in the respective first and second locations are strong enough to have an appreciable physical effect on the other rotational component, wherein magnets of one polarity on the driving rotational component in the first location attract magnets of unlike polarity on the driven rotational component in the second location to effect the rotation of the driven rotational component. The term "appreciable physical effect on the other rotational component" means that the magnets on one component have enough effect on the magnets of the other component to effect the rotation of the other component. The driving rotational component and the driven rotational component are each rotatable about rotational axes. According to some embodiments of the invention disclosed herein, the respective as axes are tiltable relative to each other. In some instances, the respective axis remain the same plane when tilting occurs, and in other instances the axes do not remain in the same plane.

Magnetic gearboxes are known in the art. Generally, two magnetically interacting magnetic gears are generally considered as being co-planar, where there is a magnetic linkage between a pair of magnetic gears where magnets on each pair of magnetic gears are in closest proximity. However, the effect of the tilting of one magnetic gear with respect to another magnetic gear where there is magnetic linkage between is not fully known. It is also heretofore unknown to provide a gearbox for magnetic gears which can be tilted towards each other but being prevailed from overlapping to prevent the reversal of the rotational direction of one of the magnetic gears. It was also unknown to provide for the reversal of direction of one magnetic gear upon the tilting of the axis of rotation of the other magnetic gears by a sufficient amount. The present invention also covers structure where the relative tilting of the axis of rotation of one of the magnetic gears can be in any direction.

Another preferred embodiment of the invention relates to gearboxes where a magnetic gear moveable in a linear direction effects the rotation of a set of gears that are sequentially magnetically linked to the movable magnetic gear to effect changes in rotational speed of the magnetic gears.

A further preferred embodiment of the invention relates to a pair of magnetic gears each having different numbers of magnets alternating polarity on the respective peripheries of the magnetic gears for varying the rotational speeds where one is the driving magnetic gear and the other is a driven magnetic gear.

The terms gearbox and magnetic gearbox as used herein means contactless mechanisms for the conversion of torque, speed and direction of magnetic gears, and does not include any housing or container for magnetic gears included in the gearbox.

BRIEF DESCRIPTION OF THE DRAWINGS

FIG. 20A shows the angle of tilting of one of the magnetic gears.

DESCRIPTION OF THE PREFERRED EMBODIMENT

Figure 1:
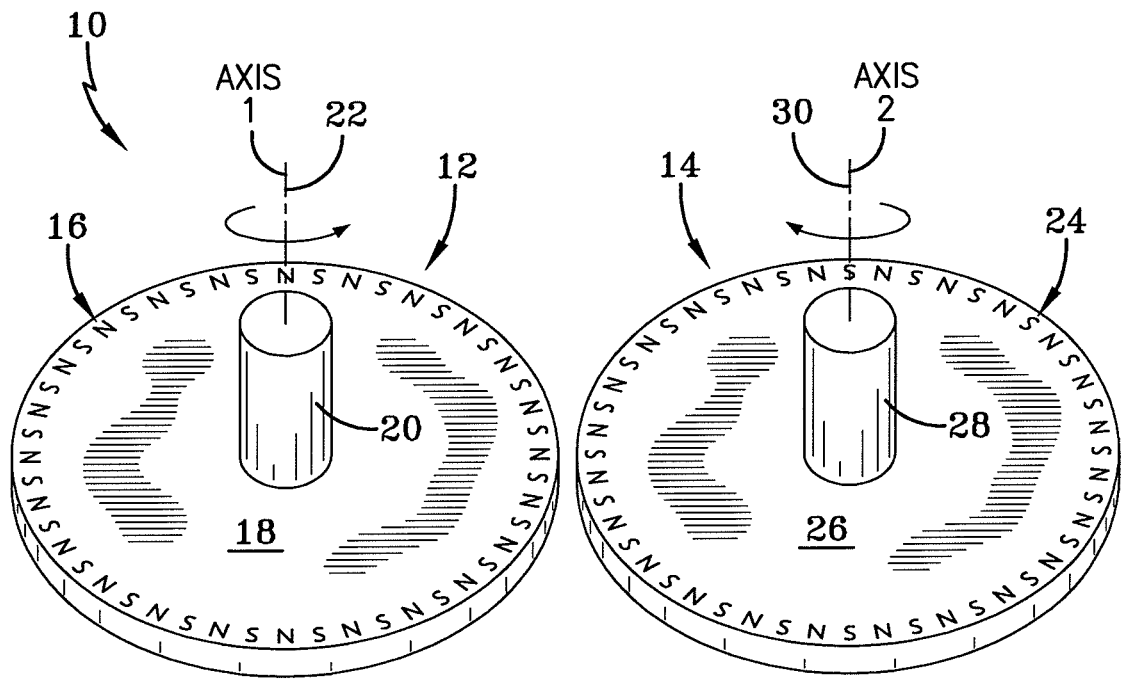
FIG. 1 is a schematic, perspective view of a preferred embodiment of the invention in its elementary form, showing driving and driven wheels.

Referring first to FIG. 1, a magnetic gear train 10 is shown (as noted earlier, magnetic wheels are being referred to as magnetic gears). Magnetic gear train 10 comprises a first magnetic gear 12 and a cooperating magnetic gear 14. Magnetic gear 12 has along its periphery a series of magnets (which includes magnetic zones) of alternating polarity, north (N) and south (S), which are collectively identified by the numeral 16, and can constitute a series of magnets embedded in the edge of a disk 18 of which magnetic gear 12 is comprised. Magnetic gear 12 has an axle 20 and a longitudinal pivot axis 22. Magnetic gear 14 has a series of alternating magnets identified collectively by the numeral 24 embedded in a disk 26 forming part of magnetic gear 14. An axle 28 rotates magnetic gear 14 about a longitudinal axis 30. Assuming magnetic gear 12 is the driving gear, some means such as a battery powered electric motor or other external motor torque is used to rotate magnetic gear 12 counterclockwise when viewed from above gear 12 and facing gear 12. As magnetic gear 12 rotates, the close proximity of disks 18 and 26 sequentially lines up unlike-magnetic poles to effect the smooth rotation of driven magnetic gear 14 in the clockwise direction when viewed from above and facing gear 14. In the embodiment shown in FIG. 1, longitudinal axes 22 and 30 are parallel, and as long as driving magnetic gear 12 rotates as a result of an external motor torque, driven magnetic gear 14 rotates as well. Disks 18 and 26 have a place of closest proximity where they are nearly adjacent.

Figure 2:
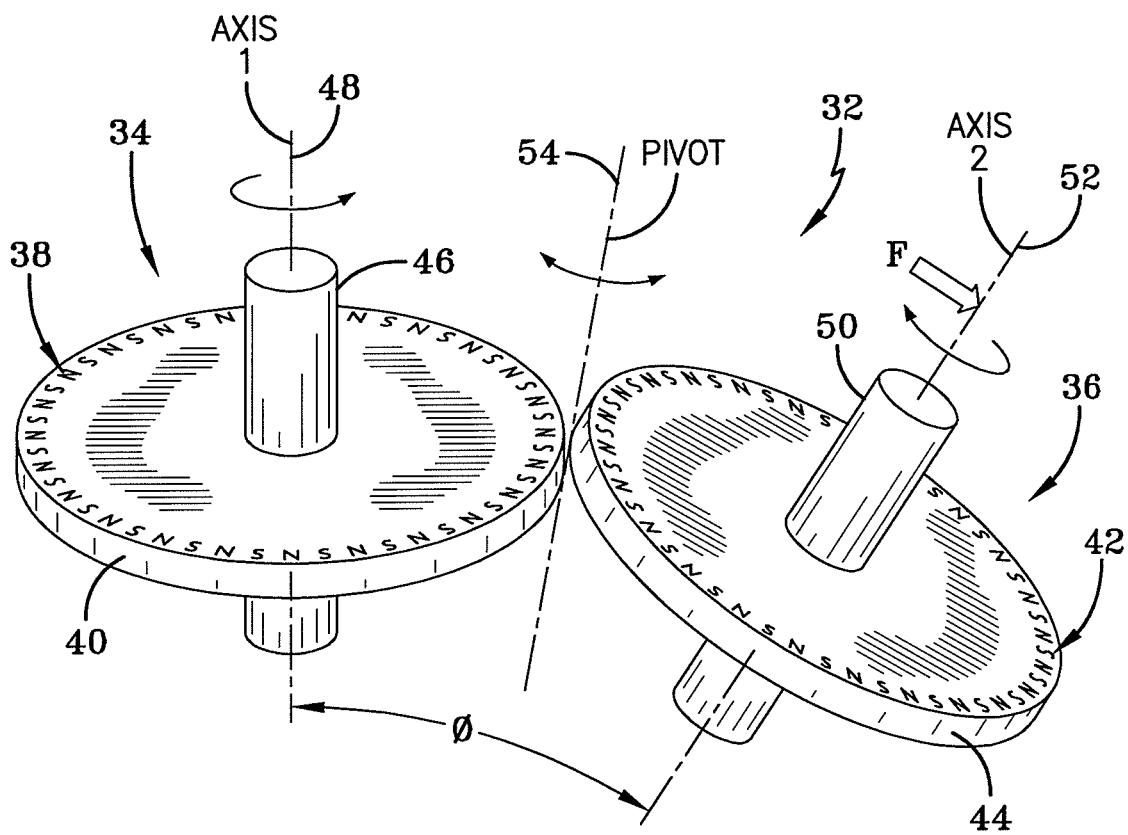
FIG. 2 is a modified version of the preferred embodiment shown in FIG. 1 in perspective form.

A similar situation is shown in FIG. 2, except that the axes of the disks are not parallel. Referring to FIG. 2, a magnetic gear train 32 is shown, having a driving magnetic gear 34 and a driven magnetic gear 36 (either gear could be the driving magnetic gear and the other the driven magnetic gear). Driving magnetic gear 34 has a series of magnets shown collectively by the numeral 38 disposed on the periphery of a disk 40 forming part of driving magnetic gear 34. Likewise, driven magnetic gear 36 has a series of magnets 42 which are disposed on the edge of disk 44 constituting part of driving magnetic gear 36. Driving magnetic gear 34 has an axle 46 which is rotatable in the counterclockwise direction when viewed from above and facing gear 34, about a longitudinal axis 48. Driven magnetic gear 36 has an axle 50 rotatable in the clockwise direction when viewed as noted immediately above, about a longitudinal axis 52. Axle 50 and longitudinal axis 52 are tilted by a tilting device shown by an arrow F, an internal acute angle θ. Driving magnetic gear 34 and driven magnetic gear 36 are pivotal about a common tangential pivot axis 54. Axis 54 extends through the place of closest proximity of gears 34 and 36. Pivot axis 54 extends through the place of closest proximity of magnetic gears 34 and 36.

Figure 3:
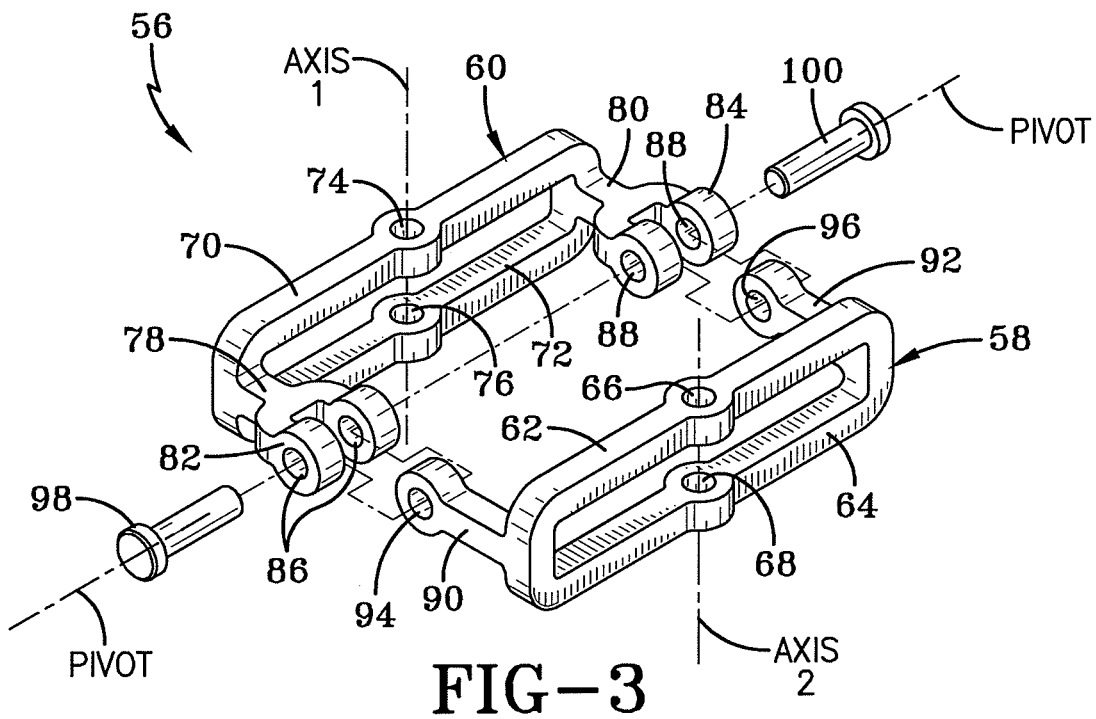
FIG. 3 shows in perspective form a schematic view of gearbox according to a preferred embodiment of the invention for incorporating the embodiment shown in FIG. 2.

A gearbox 56 for accommodating magnetic gear train 10 or 32 is shown in FIG. 3. The following description refers to gear train 32. Gearbox 56 has a first fixture 58 for housing driving magnetic gear 34, and a second fixture 60 for mounting driven magnetic gear 36 which may be of a different diameter. First fixture 58 has a pair of flanges 62 and 64 having aligned bores 66 and 68. Bores 66 and 68 receive axle 46 to maintain disk 40 in a same relative position to disk 44 as shown in FIG. 2. Second fixture 60 has a pair of opposing flanges 70 and 72 having aligned bores 74 and 76. Bores 74 and 76 receive axle 50, which may be inclined relative to axle 46 as shown in FIG. 2. Second fixture 60 further has a pair of opposing arms 78 and 80, having respective yokes 82 and 84 with aligned pairs of bores 86 and 88 for receiving between them respective arms 90 and 92 of first fixture 58. Arms 90 and 92 have aligned bores 94 and 96. Bores 94 and 96 are aligned with pairs of bores 86 and 88 when arms 90 and 92 are received in respective yokes 82 and 84. Pivot pins 98 and 100 establish a pivot corresponding to pivot axis 54 in FIG. 2.

The foregoing arrangement enables driving magnetic gear 34 to rotate under the influence of an external motor torque, to cause the rotation of driven magnetic gear 36 at the desired angle Φ. The foregoing is accomplished without the use of toothed gears and the shortcomings thereof. The size of respective fixtures 58 and 60 and their component parts can be altered to render gearbox 56 a reducing gearbox if driving gear 34 is larger than driven magnetic gear 36.

Figures 4, 5:
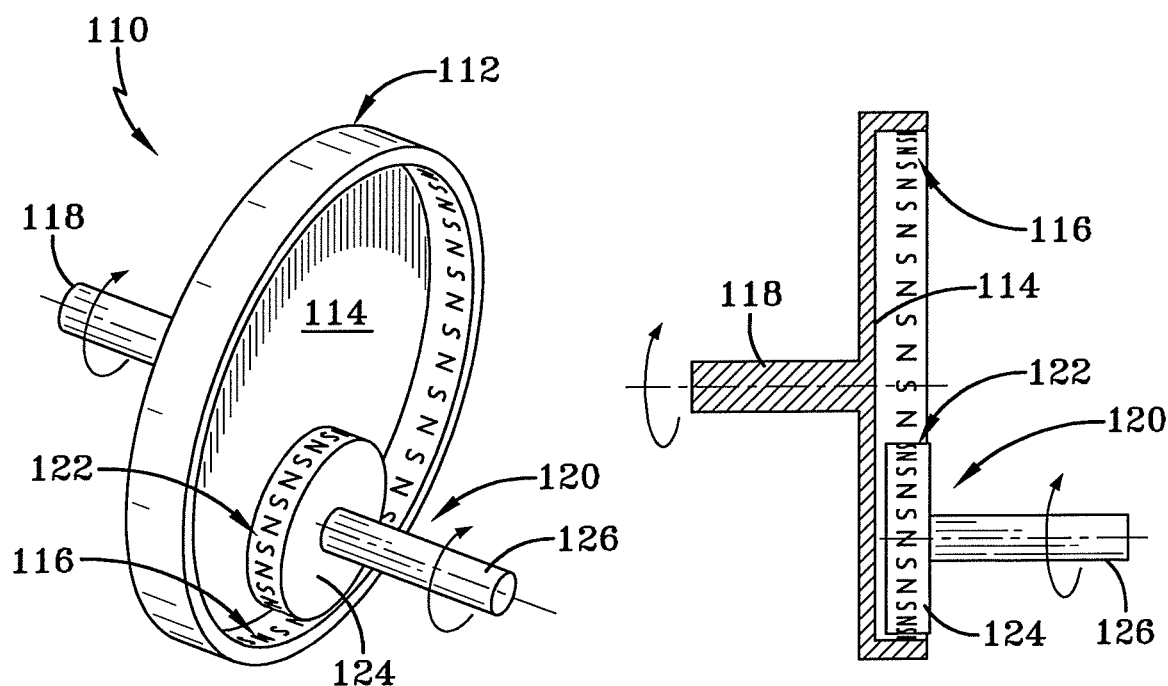
FIG. 4 shows in perspective a schematic view of another preferred embodiment of the invention showing non-contacting inner and outer magnetic wheels.
FIG. 5 is a side view of the inventions shown in FIG. 4.

FIGS. 4 and 5 show another embodiment of the invention. A magnetic gear train 110 is shown having an outer cylindrical magnetic gear 112 which is hollow but has a closed end 114, and further has a set of magnets shown collectively as numeral 116 embedded therein, adjacent ones having alternate polarities. Magnetic gear 112 further has an axle 118. Further included in magnetic gear train 110 is an internal cylindrical magnetic gear 120 having a series of alternating magnets embedded in its periphery as indicated collectively by the numeral 122 which is mounted on disk 124. A shaft 126 extends from disk 124. There is a small space separating set of magnets 116 of magnetic gear 112 which is the place of closest proximity of cylindrical magnetic gears 112 and 120, and magnets 122 of magnetic gear 120. Either of magnetic gears 112 and 120 can be the driving magnetic gear, and the other (the driven magnetic gear) rotates in response to the rotation of the driving gear because of the sequential attraction of opposite poled magnets. Assuming magnetic gear 120 is the driving gear, it is shown rotating clockwise when viewed from the front facing gear 120, and magnetic gear 112 rotates in the same direction as the driven magnetic gear. For co-axial input and output shafts, an arrangement similar to a planetary type gearbox may be used. For the limiting size of magnetic gear 120 while it occupies nearly the entire inside of magnetic gear 112, the combination becomes an infinitely resettable torque limiting clutch.

Figure 6:
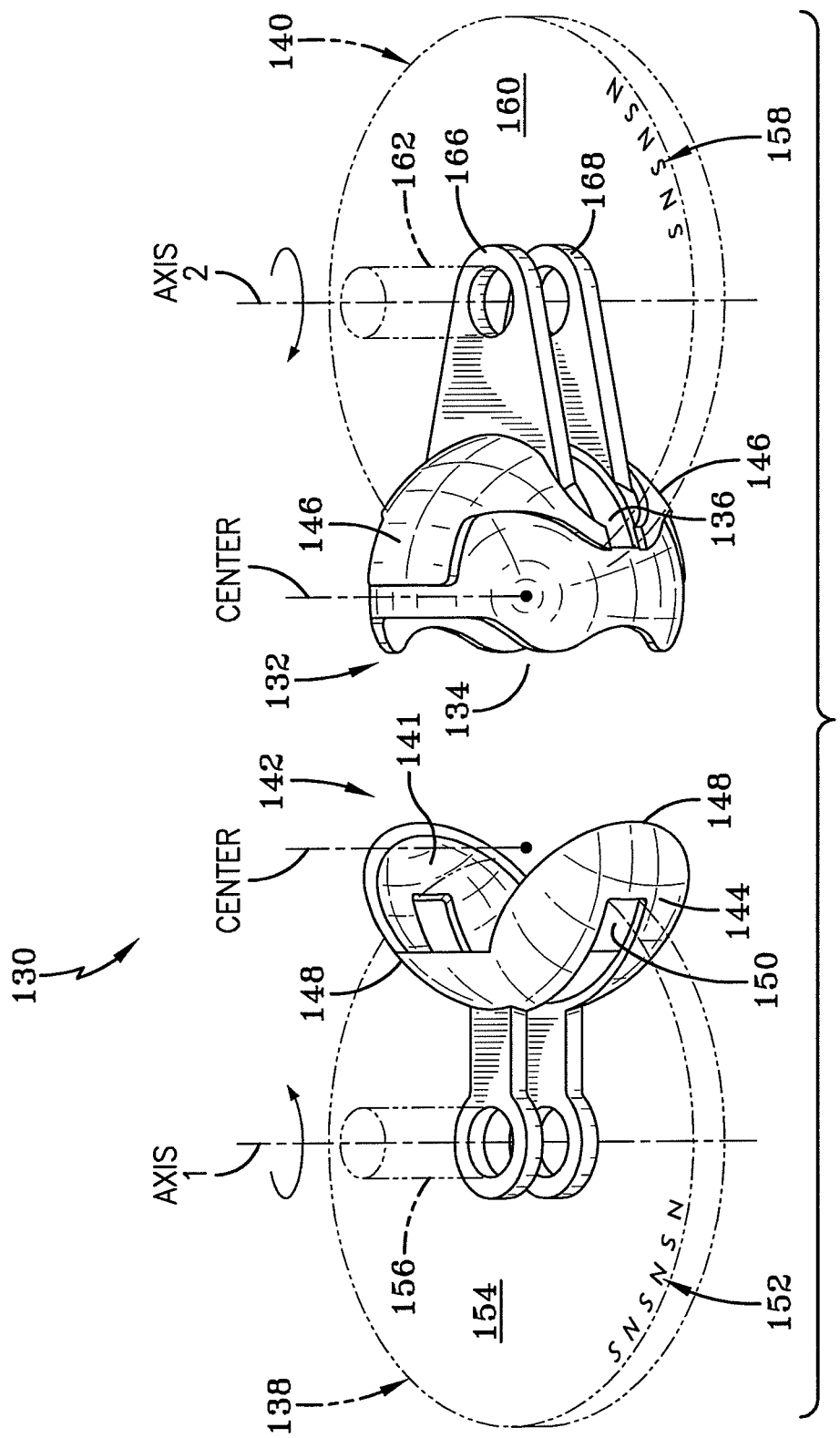
FIG. 6 is a schematic, exploded perspective view of another preferred embodiment of the invention involving a ball joint assembly.
Figure 7:
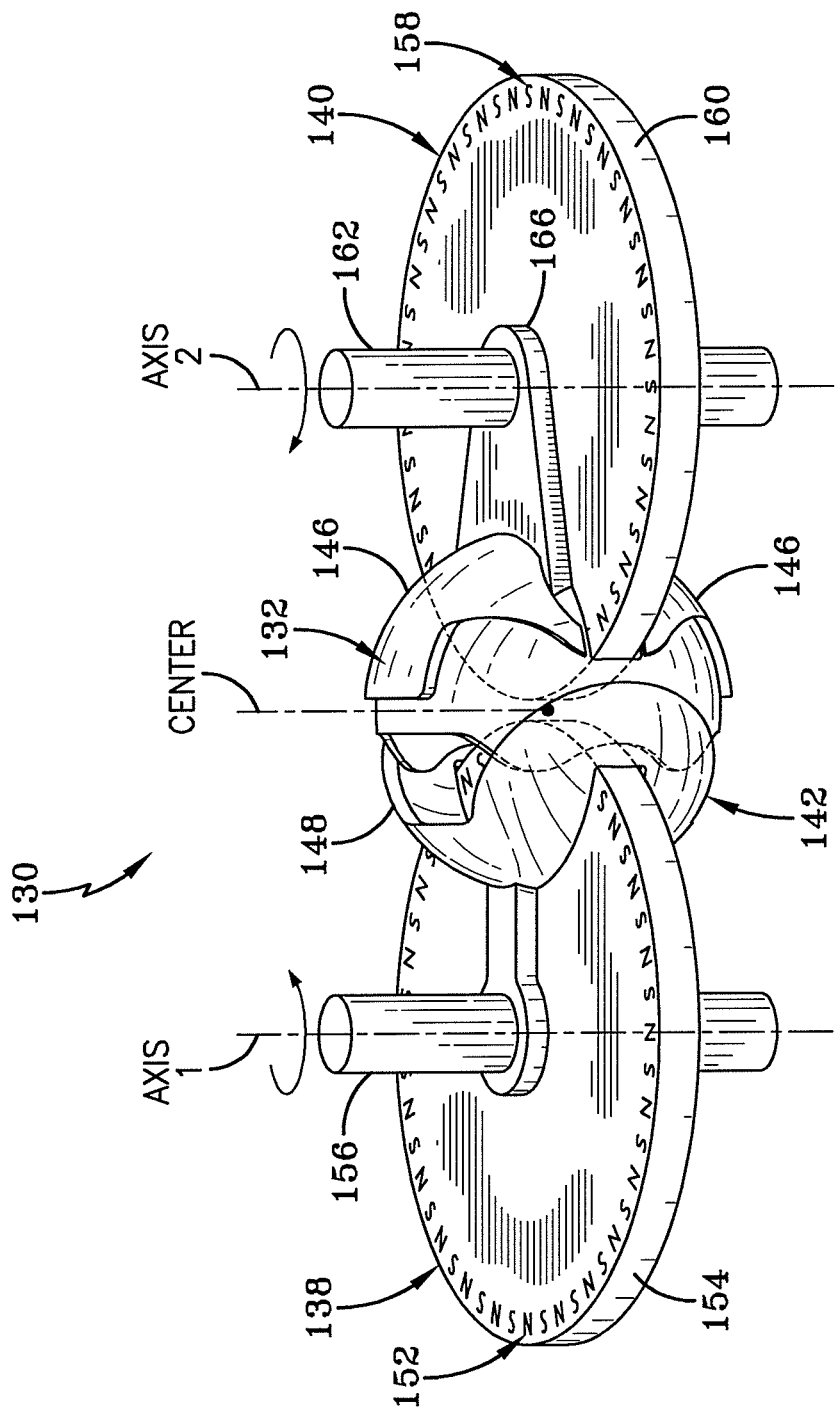
FIG. 7 is a schematic view of the embodiment shown in FIG. 6

A ball joint assembly 130 is shown schematically in FIGS. 6 and 7. Referring first to FIG. 6, ball joint assembly 130 includes a portion of a sphere or spherical portion 132 made of non-magnetic material that includes a missing portion of a sector or open sector 134 and another portion of a missing-portion-of-a-sector or gear-receiving slot 136 for, as explained below, receiving a portion of a magnetic gear 140. Spherical raised portions 146, also forming a part of a sphere, are attached to spherical portion 132. Spherical portion 132 and raised portions 146 have a spherical center shown by the point marked "CENTER" in FIG. 6. FIG. 6 includes a ball joint cap assembly 142 having a partial spherical cooperating part 144 which cooperates with raised portions 146, the latter thus partially wrapping or enclosing spherical portion sphere 132. Partial spherical cooperating part 144 of ball joint cap assembly 142 has an open-partial-spherical-portion-receiving-sector 141 which holds spherical portion 132 concentric with a small amount of clearance, and raised portions 146 limits the range of motion of spherical portion 132 within the acceptable limits of magnetic interaction between magnetic gears 138 and 140. Raised portions 146 of ball joint cap assembly 142 have a spherical center shown by the point on the left part of FIG. 6 marked "CENTER," and it coincides with the center point of spherical portion 132 when spherical portion 132 and ball joint cap assembly 142 are assembled together as shown in FIG. 7. Partial spherical cooperating part 144 includes a rounded shell portion 148 having a curved opening or driving gear-receiving slot 150 for receiving a part of magnetic gear 138. Magnetic gear 138 includes embedded in its periphery a set of magnets shown collectively by numeral 152 having alternate polarities and embedded in a disk 154. Magnetic gear 138 has an axle 156. Magnetic gear 138 extends through slot 150 and into missing portion of sector or open sector 134 of sphere 132.

Magnetic gear 140 has a set of alternating magnets shown collectively by the numeral 158 embedded around the periphery of a disk 160 from which magnetic gear 140 is formed. Magnetic gear 140 extends into gear-receiving slot 136 of the spherical portion of sphere 132. Magnetic gear 140 has an axle 162. Magnetic gears 138 and 140 are discs which can be coplanar or transverse to each other. These disks can be tilted with their respective longitudinal axes lying in the same plane by an amount which is less than 90° to prevent physical interference of the disks. They can rotate about their respective longitudinal axes AXIS 1 and AXIS 2, and longitudinal axes AXIS 1 and AXIS 2 can be tilted in any direction provided the sequential magnetic linkage between the individual magnets of gears 138 and 140 remains. The various movements of the axes of gears 138 and 140 can be done simultaneously. These are inherent features of this gear train in ball joint cap assembly 142.

Raised portions 146 of ball joint cap assembly 142 differ from the other part of ball joint cap assembly 142. Raised portions 146 are partial spherical sectors on opposite sides of a pair of parallel flanges 166 and 168 to give magnetic gear 140 access to gear-receiving slot 136 of spherical portion 132. Flanges 166 and 168 extend from spherical portion 132 on opposite sides of missing-portion-of-a-sector or gear-receiving slot 136 which flanges 166 and 168 have respective aligned orifices for receiving axle 162 extending from magnetic gear 140.

The operation of ball joint assembly involves the rotation of one of magnetic gears 138 or 140 by an electric motor or other motive power source (gear 138 is shown rotating counterclockwise when viewed from above facing gear 138), which causes the other magnetic gear 138 or 140 to rotate in the opposite direction as dissimilar poles of set of magnets 152 and 158 are opposite each other in polarity and interact magnetically attractively. Those magnetically interacting magnets are proximate to the location where respective individual magnets of sets of magnets 152 and 158 are closest to each other, marked by the point or dot labelled "CENTER" in FIG. 19. The point marked "CENTER" is the pitch point defined by the tangency of the inherent pitch circles of magnetic gears 138 and 140. Stated in gear technology, the point marked "CENTER" is at the point of tangency of the pitch circles of the magnetic gears 138 and 140. The foregoing point of tangency is called the pivot point. Ball joint assembly 130 is advantageous in that axles 156 and 162 can be tilted relative to each other as sphere 132 tilts about pitch point "CENTER", but axles 156 and 162 cannot be perpendicular to each other since the sequential magnetic linkage between individual magnets would be lost, and hence, rotation would not be possible, and the limitation on the relative tilting and relative rotation of axles 156 and 162 is accomplished by the abutment of the end of one of raised portions 146 and the surface of rounded shell portion 148. Thus, tops of axles 156 and 162 can be tilted towards or away from each other, and they can also rotate to some extent about axes perpendicular to the respective axles 156 and 162. In other words, inherently torque limiting magnetically coupled wheels or gears 138 and 140 may be used in a manner similar to gears in mesh such that a rotation of one of the magnetic wheels or gears 138 or 140 produces a corresponding rotation of the other wheel or gears 138 and 140 without any physical contact between them. This permits complete continuous shaft rotation when axles 156 and 162 are parallel, and axles 156 and 162 can be shifted angularly and continue to rotate unlike classical gears with solid teeth, and they can be shifted angularly and continue to rotate. Gears 138 and 140 can thus be tilted with their longitudinal axes AXIS 1 and AXIS 2 remaining in the same plane, gears 138 and 140 can rotate respectively about AXIS 1 and AXIS 2, and gears 138 and 140 with their longitudinal axes AXIS 1 and AXIS 2 pivoting about the point or dot on the line marked CENTER in any direction so long as the sequential magnetic linkage remains between the magnets of respective gears 138 and 140 in the vicinity of the dot. This is all inherent in the structure shown, although reversal of the magnetic linkage would inherently occur upon gears 138 and 140 assuming certain relationships with respect to their relative positions if gears 138 and 140 were to be released from the restraining ball joint assembly 130 which is intended to keep gears 138 and 140 rotating in the same direction, to maintain the sequential magnetic linkage between gears 138 and 140.

The inherent reversal of rotation can be understood with reference to FIG. 1. The foregoing release of restraint of gears 12 and 14 from the reversal of magnetic linkage for keeping magnetic gears 12 and 14 rotating in the same direction, as is the case for gears 138 and 140 in FIGS. 6 and 7, is explained as follows. Referring to FIG. 1, magnetic gear 14 is tiltable about an axis at the pivot point (where gears 12 and 14 are closest to each other) between the centers of gears 12 and 14, the latter axis being parallel to longitudinal axes 22 and 30. When the tilting of gear 14 relative to gear 12 reaches a sufficient amount, the rotation of magnetic gear 14 necessarily ceases and with further tilting of gear 14 the rotation thereof commences in the opposite direction. The exact relative angles of tilting to cause cessation of rotation of a driven gear and the reversal of rotation depends on two main factors: the magnetic strengths of the respective driving and driven magnetic gears and the thickness of the respective magnetic gears. The value of the tilting angle to cause the cessation and then reversal of rotation of the driven magnetic gear increases as the strength of the respective magnets 16 and 24 of driving and driven gears 12 and 14 increases, and likewise increases as the respective gears get thinner. With the type of magnetic gears envisioned for most applications of the present invention, the tilting angle is expected to be in the range of 20°-30°. The sequential magnetic linkage between magnetic gears 12 and 14 become weaker as the tipping angle approaches 90°. The magnetic field between driving gear 12 and driven gear 14 would be at its maximum value when gears 12 and 14 are parallel as shown in FIG. 1, or when they are opposed to each other and in a sandwiched orientation. Thus, the relative tilting of magnetic gear 14 relative to magnetic gear 12 by the amount as discussed above results in the cessation of rotation of magnetic gear 14 and subsequent reversal as gear 14 gradually proceeds to rotate about AXIS 2 of driven gear 14 when sequential magnetic linkage is re-established with magnetic gear 12.

Similarly, in FIG. 2 where axles 46 and 50 are angled relatively towards each other by angle Φ and such release of restraint is implemented where driven magnetic gear 36 is allowed to tilt laterally (as shown) about the axis located at the line between the centers of gears 34 and 36 at the point of nearest approach (or pivot point through which common tangential pivot axis passes) so long as magnetic gears 34 and 36 do not physically interfere with each other.

Figure 8A:
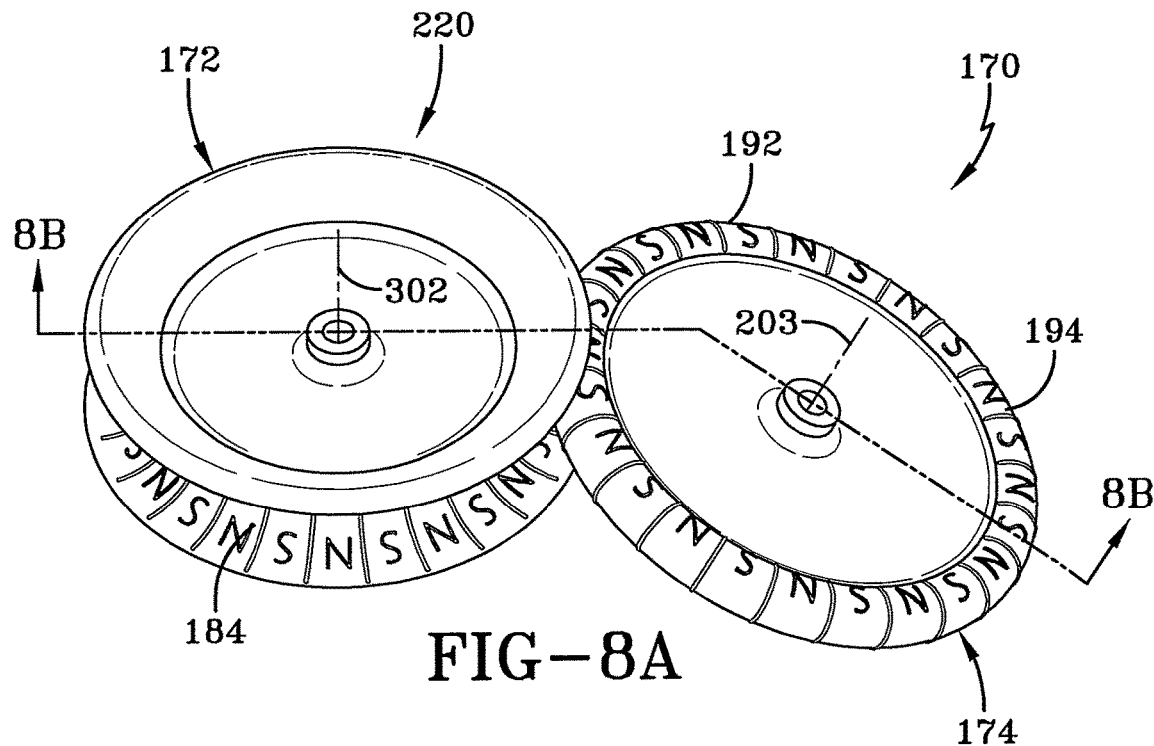
FIGS. 8A and 8B are schematic views of a gear train according to another preferred embodiment of the invention, with FIG. 8A being a perspective view and FIG. 8B being taken in the direction 8B-8B in FIG. 8A.
Figure 8B:
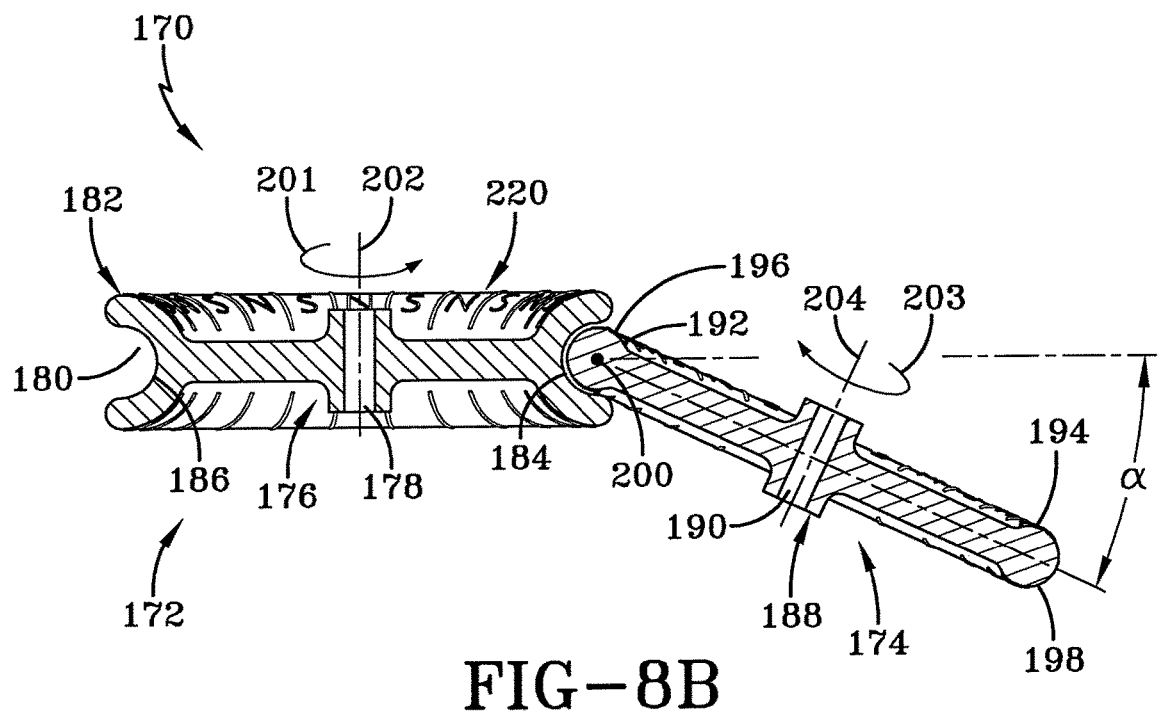

Referring next to FIGS. 8A and 8B, a gearbox 170 in schematic form is shown. Gearbox 170 includes a first magnetic gear 172 and a second magnetic gear 174. Magnetic gear 172 includes a shaft receiving portion 176 having a bore 178 for holding a shaft for rotating magnetic gear 172 or being rotated with magnetic gear 174 (depending on whether the latter is the driving or the driven gear). The outer edge of magnetic gear 172 has a circumferential depression 180 with magnets of alternating polarity (N, S, N, S, N, S . . . ) as indicated by respective numerals 184 and 186, embedded therein.

Magnetic gear 174 has a shaft receiving portion 188 with a bore 190 for receiving a shaft which is rotatable within (or rotatable with) magnetic gear 174. Magnetic gear 174 includes an approximately toroidal ring 192 of magnetic material with short, adjacent segments 194 of said ring 192 having alternate magnetic polarities. Adjacent magnetic segments 194 with opposing polarities are adjacent to but not contacting circumferential depression 180 at the location where a part of toroidal ring 192 is within depression 180 at a pivot point 200 which is the point (or line) at which the pitch circles of magnetic gears 172 and 174 are tangent to each other, and about which magnetic gear 174 is pivotable or tiltable; magnetic gear 174 can rotate clockwise as shown by the arrow 203 about its longitudinal axis 204 (when viewed from above) in response to the rotation of magnetic gear 172 rotating counterclockwise as shown by the arrow 201 about its longitudinal axis 202 (when viewed from above), with magnetic gear 174 being inclined from magnetic gear 172 by a variable angle α. Pivot point 200 is defined as the geometric center of the gap between one of the magnets 184 on first magnetic gear 172 having one polarity at the point of closest proximity and one of the magnetic segments 194 on magnetic gear 174 of the opposite polarity at the point of closest proximity. The term "geometric center" can be considered as that center where the gap is maintained as one magnetic gear is pivoted about it. Magnetic gear 174 has a shaft that can rotate clockwise about longitudinal axis 204, and as noted angle α can vary while the respective rotations are taking place.

Figures 9A, 9B:
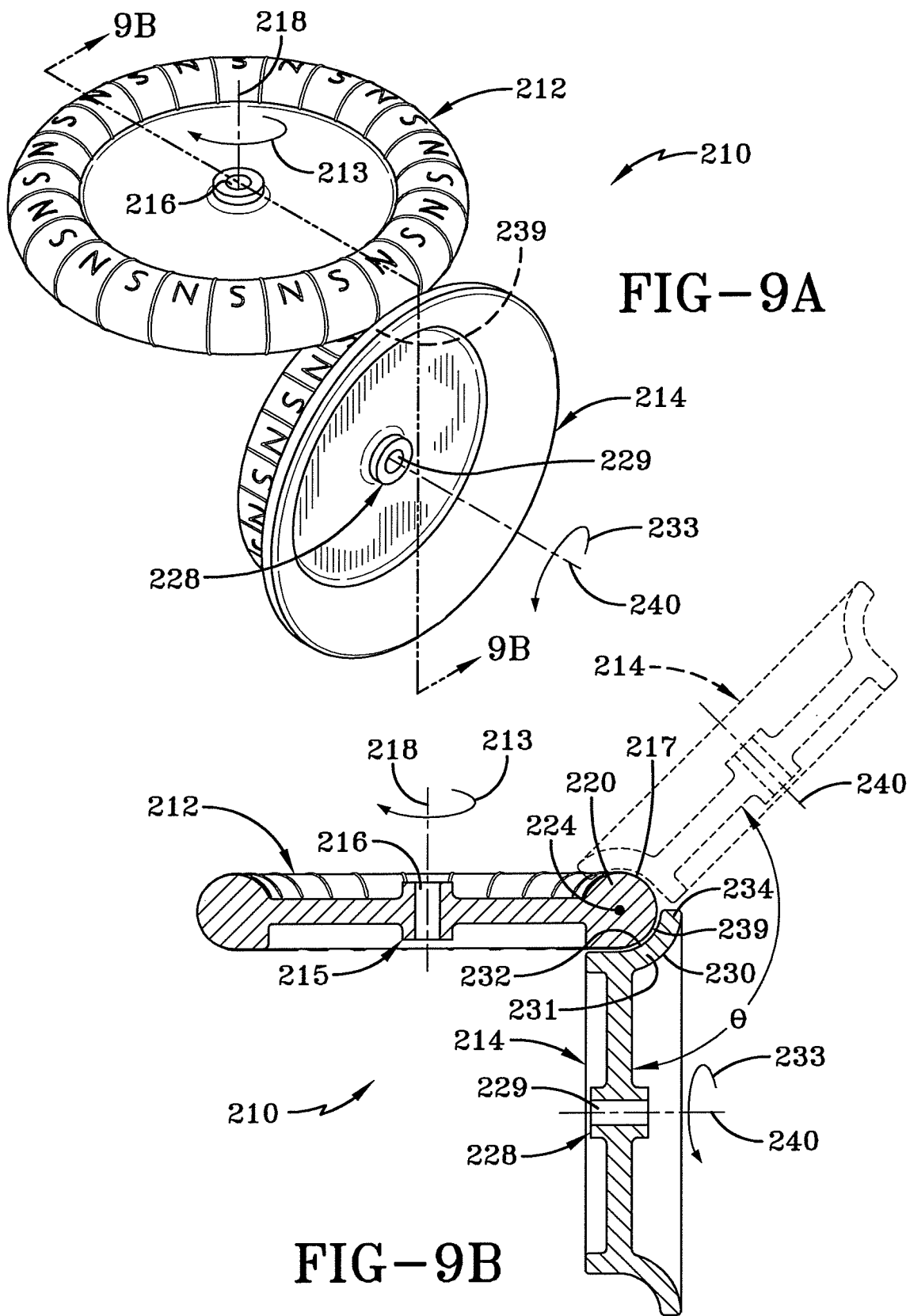
FIGS. 9A and 9B show another gear train according to still a further preferred embodiment of the invention, with FIG. 9A being a perspective view and FIG. 9B being taken in the direction 9B-9B in FIG. 9A.

FIGS. 9A and 9B show a gear train 210. Gear train 210 includes a driving (or driven) magnetic gear 212 and a driven (or driving) magnetic gear 214. Driving magnetic gear 212 rotates under the influence of an external motor torque, in the clockwise direction shown by an arrow 213 when viewed from above facing magnetic gear 212 about a longitudinal axis 218. Driving magnetic gear 212 includes a shaft receiving portion 215 having a bore 216, and a non-circular toroidal ring 217 at the edge of driving magnetic gear 212. Gear 214 rotates in the opposite direction from gear 212. Ring 217 has embedded therein a series of magnets identified respectively and collectively by numeral 220, which respective adjacent magnets are of opposite polarity. A hinge whose axis 224 is tangent to both magnetic gears 212 and 214 in a gearbox housing is shown. Driven magnetic gear 214 includes a toroidal ring 230 having a depression 232 with a partial cylindrical part 231. Toroidal ring 230 has on the portion surrounding depression 232 a set of embedded magnets shown collectively as numeral 234, adjacent magnets being of opposite polarity and being spaced from series of magnets 220 on ring 217. A shaft receiving portion 228 has a longitudinal axis 240 about which a shaft extending through a bore 229 is rotatable counterclockwise as shown by an arrow 233 when viewed from the right. Magnetic gear 212 is disposed in part of depression 232 of magnetic gear 214, and a point of closest proximity 239 occurs as shown in FIGS. 9A and 9B where rotation of driving magnetic gear 212 (or 214) effects rotation of the driven magnetic gear 214 (or 212) in the opposite direction. Axis 240 of driven magnetic gear 214 is rotatable through variable angle θ which may slightly exceed 90° below the plane of magnetic gear 214 and as much as 45° above said plane for enabling the rotation of the shaft extending through bore 229 while said driven magnetic gear 214 is being rotated with respect to magnetic gear 212, as shown by arrows 233 in FIGS. 9A and 9B.

Figure 10:
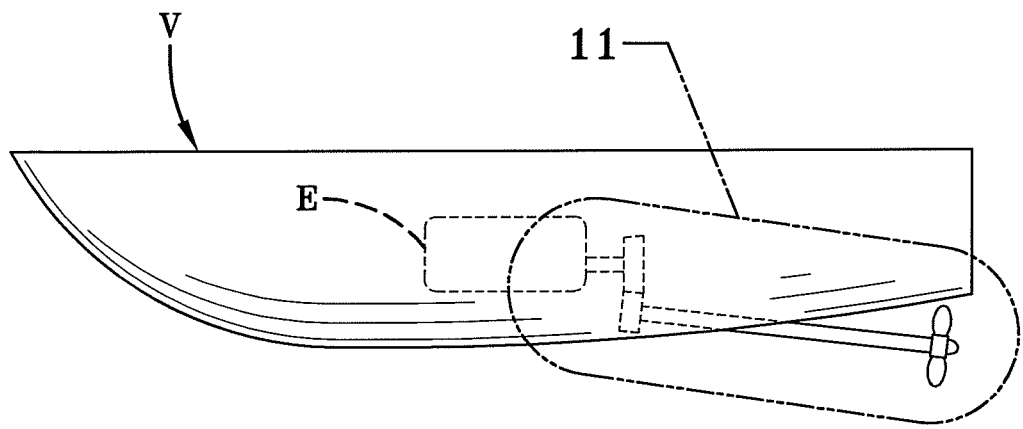
FIG. 10 shows a preferred embodiment of the invention for use in a maritime environment for driving the propeller of a water vessel.
Figure 11:
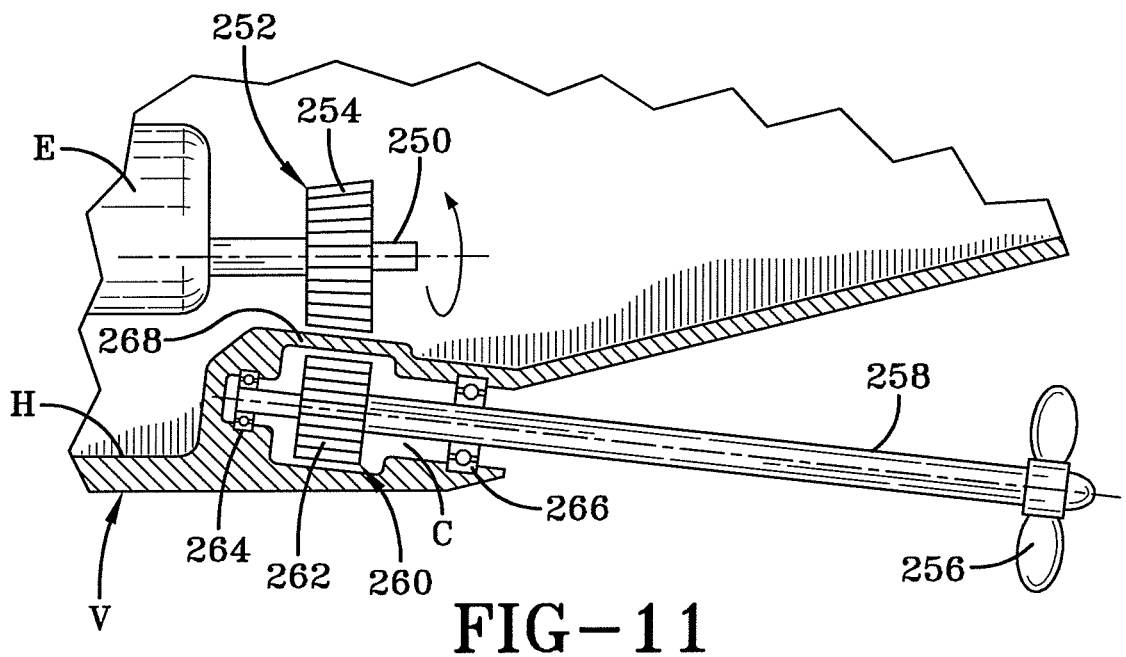
FIG. 11 is a detailed, schematic cross sectional view of the embodiment shown in FIG. 10.
Figure 11A:
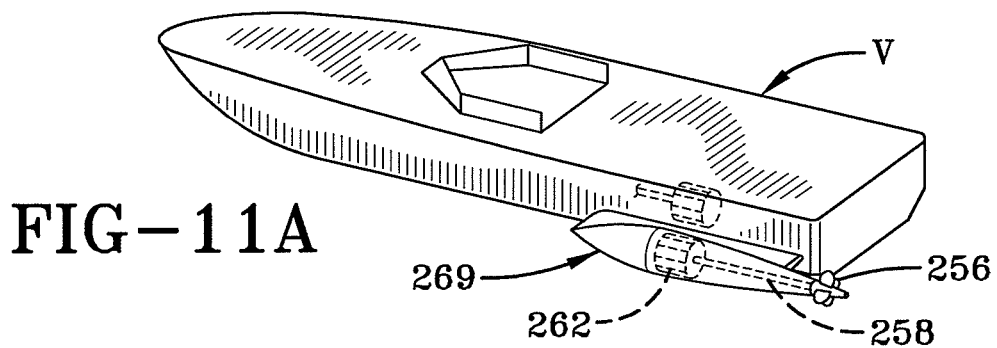
FIG. 11A shows a variation of this embodiment with a demountable pod.

The incorporation of a reduction gear train in a water vessel or watercraft is shown in FIGS. 10 and 11. These illustrations show a vessel V having an engine E. Vessel V has a hull H. Vessel V includes a gear and shaft cavity C for holding a magnetic gear and propeller shaft as discussed below. Extending from engine E is a drive shaft 250 on which is mounted a magnetic gear 252. Magnetic gear 252 has on its surface a series of magnets embedded therein identified collectively by the numeral 254, adjacent magnets having opposite polarity. Magnetic gear 252 is rotatable as shown in the counterclockwise direction when viewed from the right facing magnetic gear 252, with the rotation of drive shaft 250. A propeller 256 is mounted on a driven shaft 258, and mounted on driven shaft 258 is a magnetic gear 260 having on its surface embedded therein a series of magnets identified collectively by the numeral 262. Adjacent series of magnets 262 have opposite polarity. Shaft 258 is supported for rotation (in the opposite direction from drive shaft 250) by bearings 264 and 266. These bearings 264 and 266 may alternatively be a magnetic type. Magnetic gears 252 and 260 are adjacent but spaced from each other and separated by a preferably non-conductive and non-magnetic hull portion 268. The rotation of magnetic gear 252 mounted on drive shaft 250 effects the rotation of magnetic gear 260 even though they are separated by the hull portion 268. This arrangement has very significant advantages. First, since no water or other deleterious material will be able to either contact magnetic gear 252, drive shaft 250 or engine E; this arrangement would have a long life and significant economic advantages over present systems since no hole need be provided in the hull for receiving a drive shaft, and likewise there need not be required a stuffing box or some other equipment for preventing sea or other ambient water from passing through the hull. Furthermore, this arrangement would be much simpler to install, since no work need be done with the vessel V at all in order to accommodate the foregoing magnetic gear arrangement. All of the problems associated with leakage into the vessel would be avoided. In fact, the external portion of the propulsion system could be composed of easily demountable modules clamped or otherwise fastened to the exterior of hull portion 268. As a variation as shown in FIG. 11A, shaft 258, series of magnets 262 and propeller 256 could be part of a demountable pod 269 for enabling easy replacement of the entire pod 269 inclusive of shaft 258, series of magnets 262 and propeller 256.

Figure 13:
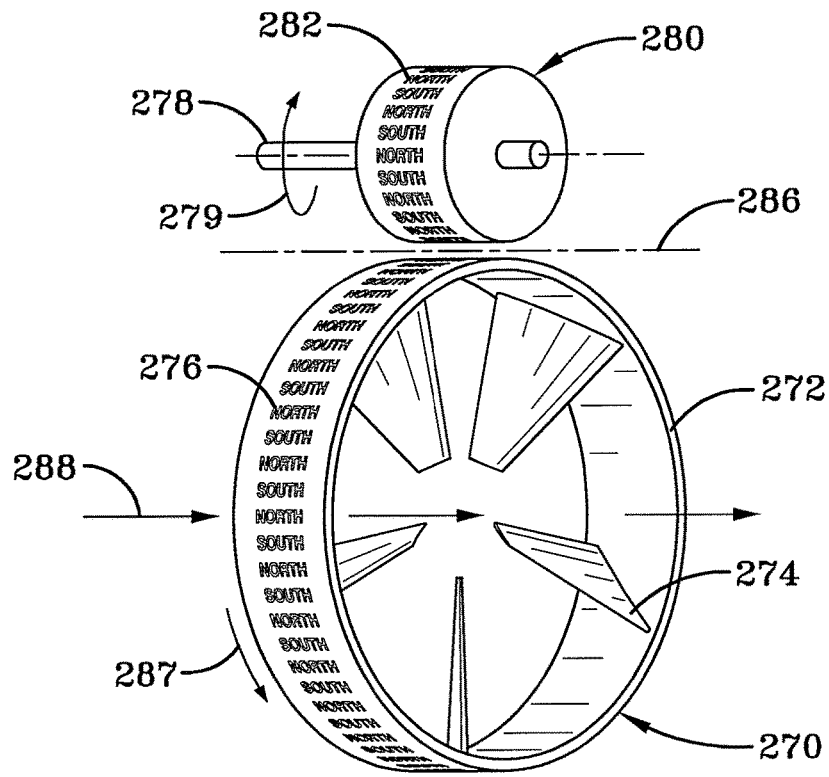
FIG. 13 is a schematic, perspective view of one version of the embodiment shown in FIG. 12.
Figures 12, 14:
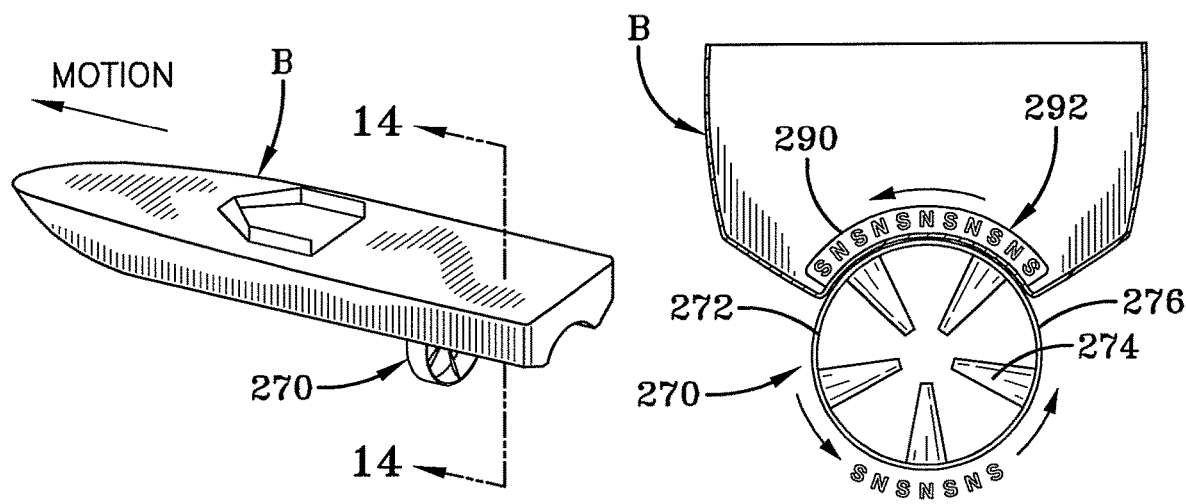
FIG. 12 is a schematic view of the invention in a further preferred embodiment for rotating a propeller blade assembly having blades extending internally from an outer housing.
FIG. 14 is a schematic view of another version of the embodiment shown in FIG. 12.

Another maritime uses of the present invention is shown in FIGS. 12, 13 and 14. FIG. 12 shows a boat B having a propeller drive assembly 270. Referring to FIGS. 13 and 14, propeller drive assembly 270 has an outer housing 272 from which extend radially inwardly, a set of propeller vanes 274. Outer housing 272 is a magnetic gear and has embedded across its outer surface a series of magnets embedded therein, identified collectively by the numeral 276 of which adjacent magnets are of opposite polarity. Turning specifically to FIG. 13, boat B has an engine shaft 278 which is shown by an arrow 279 as being rotatable in the clockwise direction when viewed from a magnetic gear 280 mounted on engine shaft 278. Magnetic gear 280 can have a cylindrical or conical outer periphery in which are embedded a series of magnets identified collectively by numeral 282, and adjacent magnets 282 are of opposite polarity. A preferably non-conductive and non-magnetic hull 286 separate magnetic gear 280 from the propeller drive assembly 270. Magnetic gear 280 is a driven drum. Engine shaft 278 rotates magnetic gear 280, which in turn rotates propeller drive assembly 270 counterclockwise when viewed from the left as shown by arrow 287 by virtue of the sequential alignment of magnets of like polarity on outer housing 272 and magnetic gear 280. Water flows in the direction shown by arrows 288. Bearings are provided to prevent axial or radical motion with respect to the hull and may be achieved by hydrodynamic, magnetic or mechanical means.

Series of magnets 282 of magnetic gear 280 sequentially enter a first location on one side of non-magnetic hull 286 which is spaced from and adjacent to a second location on the other side of non-magnetic hull 286, the first and second locations being in the magnetic fields the respective magnets of series of magnets 282 and 276 and such adjacent magnetics whose magnets flux physically effects the other magnetic gear, in the respective locations. Series of magnets 282 in the first location having the opposite polarity as a set of magnets 276 in the second location cumulatively effect the rotation of propeller drive assembly 270 as the magnets move through the respective first and second location. That is, the latter magnets have appreciable physical effect on the other magnetic gear.

In an alternate arrangement shown in FIG. 14, the same propeller drive assembly 270 is used in the embodiment shown in FIG. 13, but a curved linear induction motor 290 establishes a series of alternating polarities travelling about the center of rotation of drive assembly 270 indicated by the numeral 292 which sequentially line up through preferably non-conductive and non-magnetic hull 286 with set of magnets 276 of unlike polarity, to effect the rotation of outer housing 272. The same advantages would apply in this embodiment as in the embodiment shown in FIG. 12, since there is no need to pierce the hull or boat B.

A propeller drive assembly 270 driven from inside hull 286 could also possibly have hydrodynamic or magnetic support bearings in order to further eliminate frictional energy losses. Although a propulsion system for a waterborne vessel or watercraft has been described here, this system may be advantageously applied to propel aircraft or other craft through other fluids. If it could be made sufficiently light and stiff.

Figure 15A:
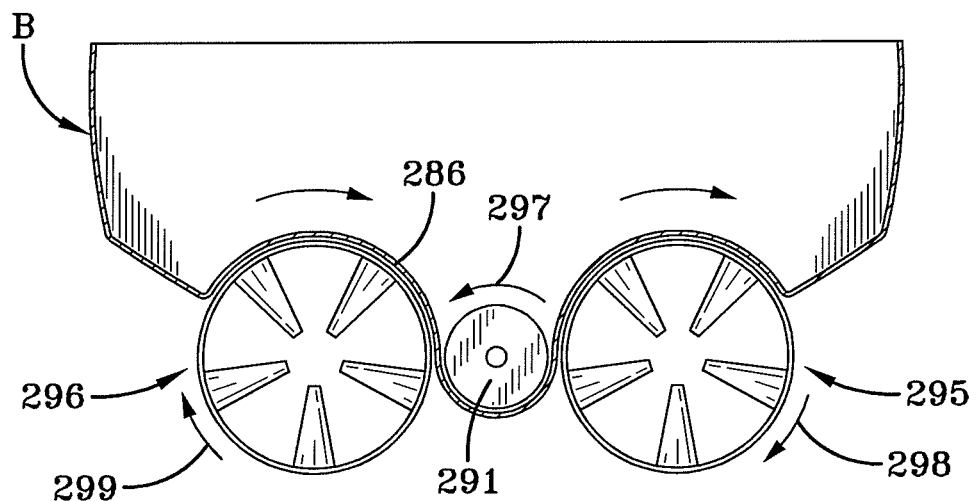
FIG. 15A is a schematic view of another preferred embodiment having a magnetic gear for driving a pair of magnetic propeller drive assemblies.
Figure 15B:
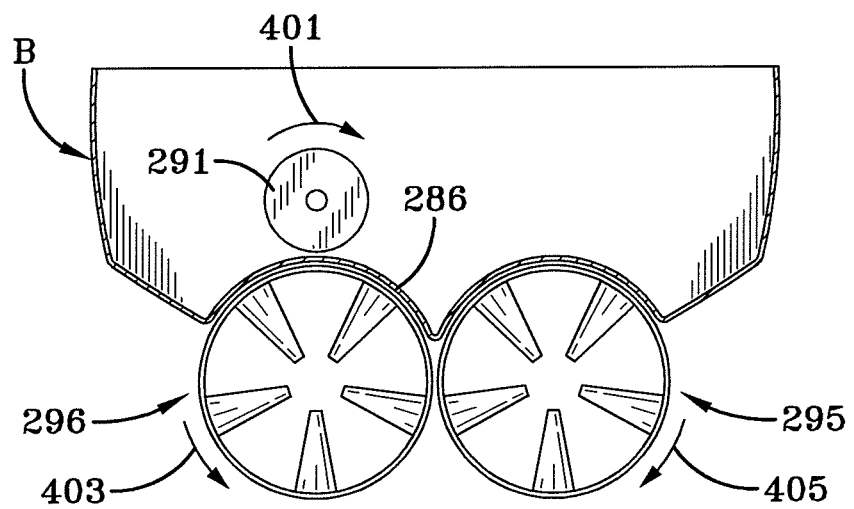
FIG. 15B shows a variation on the embodiment shown in FIG. 15A.

FIGS. 15A and 15B show arrangements similar to that of FIG. 13. A magnetic gear 291 rotated by an electric motor or the like is on one side of preferably non-conductive and non-magnetic hull 286, and a pair of propeller drive assemblies 295 and 296, which are all constructed as is propeller drive assembly 270, and reference is made to the description of propeller drive assembly 270 and to magnetic gear 280 for explanation of the apparatus shown in FIGS. 15A and 15B. Magnetic gear 291 is shown rotating in the counterclockwise direction indicated by an arrow 297, which effects the rotation of propeller drive assemblies 295 and 296 in the clockwise direction shown by arrows 298 and 299. FIG. 15B shows a variation where a magnetic gear 294 effects the rotation of propeller drive assembly 296 which in turn rotates propeller drive assembly 295 in the opposite direction. Magnetic gear 294 is shown rotating clockwise by arrow 401 causing propeller drive assembly 296 to rotate counterclockwise as shown by an arrow 403, which causes propeller drive assembly 295 to rotate clockwise. The magnetic segments are not shown for each of magnetic gear 291 and propeller drive assemblies 295 and 296, but they are included in each of these components.

Figure 16:
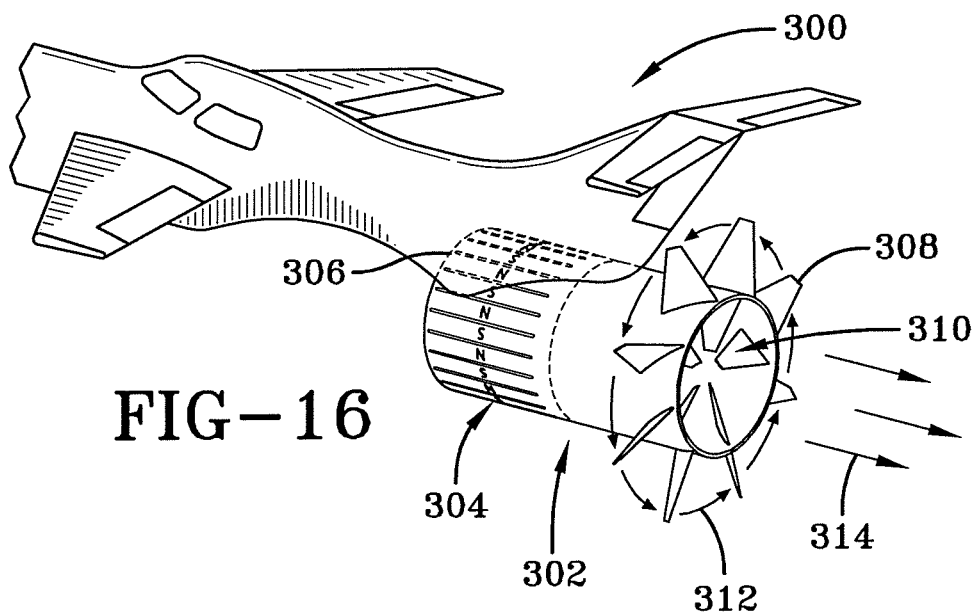
FIG. 16 is a schematic perspective view of an aircraft having a propeller drive assembly according to another preferred embodiment of the invention.
Figure 17:
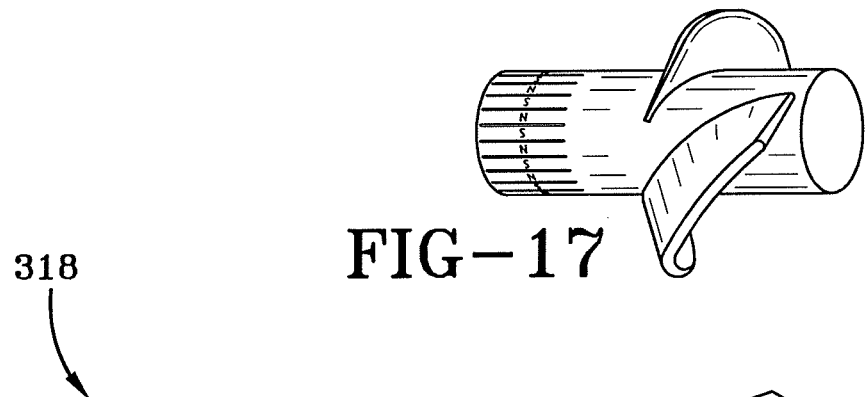
FIG. 17 is a variation on a portion of the propeller drive assembly shown in FIG. 16.

The inventive concept has numerous other applications. It can for example be used in aircraft. Referring to FIG. 16, an aircraft 300 is shown. Aircraft 300 has a propeller support housing 302 having on one portion a set of alternating polarity magnetic segments 304. Support housing 302 is mounted for rotation about a set of appropriate radial and thrust bearings 306. Extending from the aft part of support housing 302 is a set of external propeller blades 308 and internal propeller blades 310. Aircraft 300 has either an electrical induction drive or other electrical structure for sequentially lining up like magnetic poles with like magnetic poles of magnetic segments 304 to cause support housing 302 to rotate. An arrow 312 shows that support housing 302 is rotating in the counterclockwise direction, and a set of arrows 314 shows the airflow moving tailward. Support housing 302 could be replaced by an appropriate support auger air screw 316 shown in FIG. 17 having appropriate external blades 318 mounted spirally on a body 320 of auger air screw 316.

Figure 18:
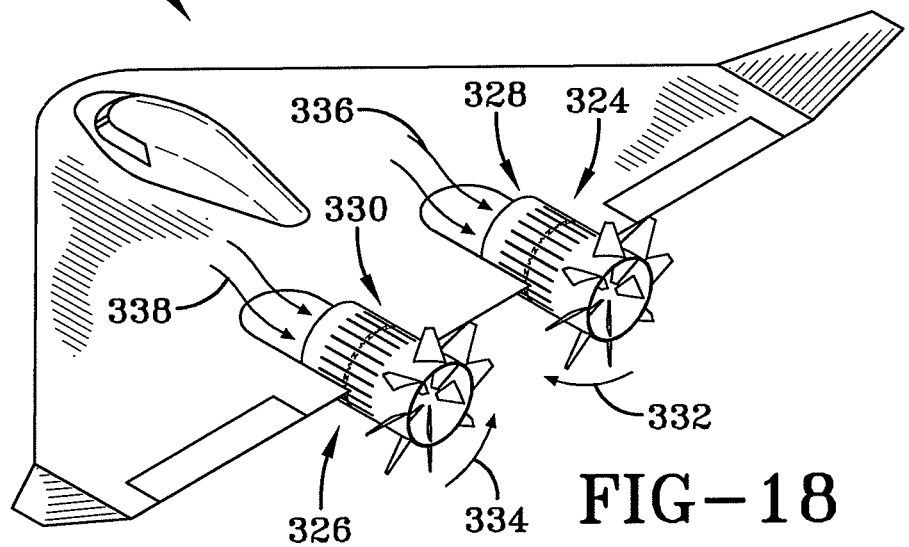
FIG. 18 is a variation on the embodiment shown in FIG. 16.

A plurality of alternating magnetic propulsion systems for aircraft is also possible. A delta flying wing aircraft 322 is shown in FIG. 18. A pair of propeller support housing 324 and 326 like propeller support housing 302 is provided at the tail end of aircraft 322. Support housing 324 and 326 respectively have alternating magnetic polarity segments 328 and 330 which are electrically driven in a rotational movement by an appropriate electrical driving system in aircraft 322. This is shown as effecting the clockwise rotation of support housing 324 shown by arrow 332 and the counterclockwise rotation of support housing 326 indicated by arrow 334. Airflow is shown by sets of arrows 336 and 338, and could beneficially be used to ingest/remove turbulent air from above the wing and increasing its lifting capability.

Figure 19:
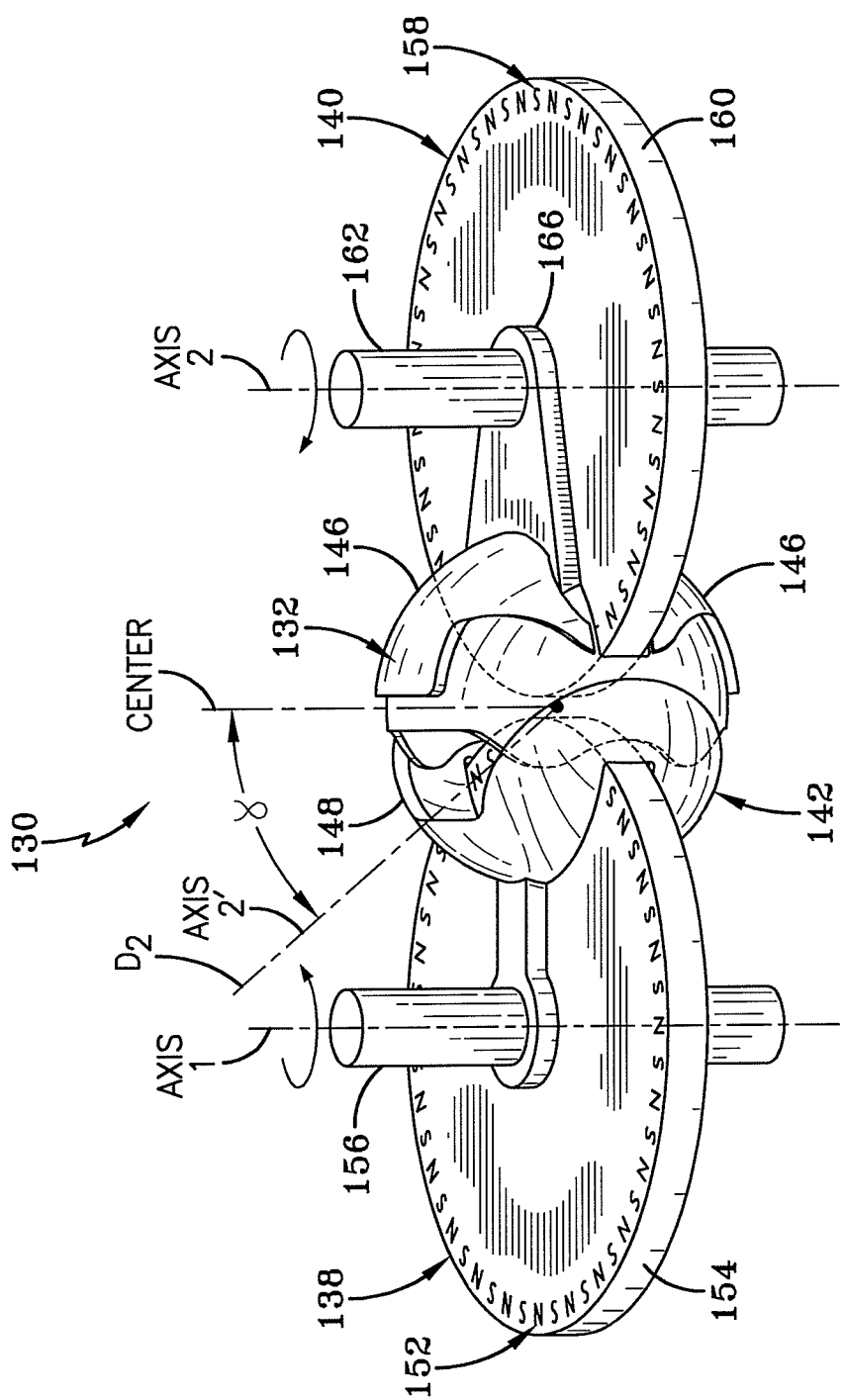
FIG. 19 is a variation of the embodiment shown in FIG. 7 indicating the furthest amount of the rotation or tilting of one magnetic gear relative to another magnetic gear when both are operationally connected in a ball joint assembly according to the invention.
Figure 20:
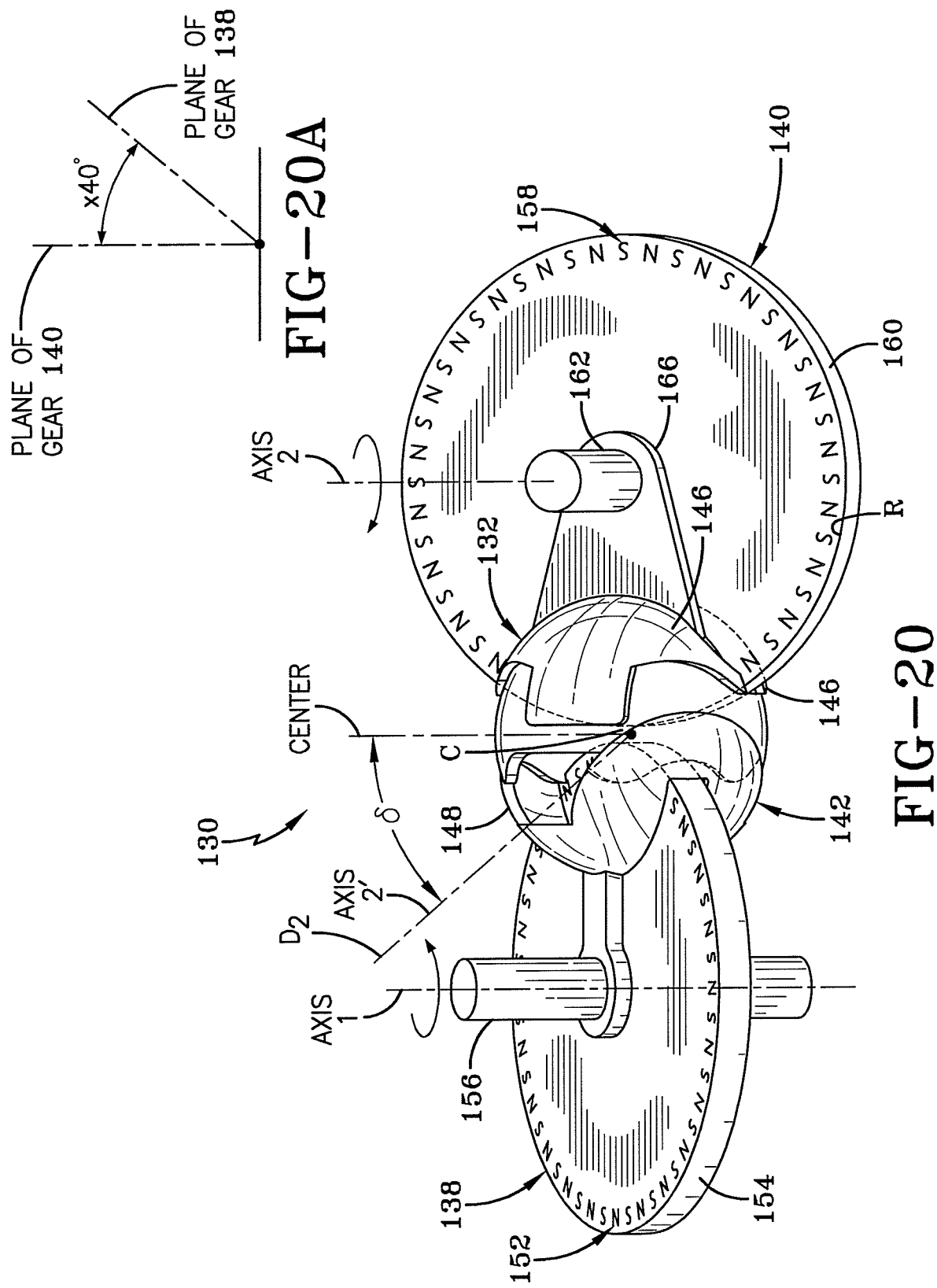
FIG. 20 is a pictorial schematic view of a pair of magnetic gears with the driven gear being tilted towards the viewer.

Referring to FIG. 19, which is a variation of FIG. 7, the structure of FIG. 7 is shown with the same identification numbers incorporated therein. Magnetic gear 140 can be tilted as indicated by the dotted lines showing the furthest amount of rotation, which is limited by raised portion 146 and rounded shell portion 148 which spherical portion 132 abuts at the amount of maximum rotation. The rotation is limited as shown by the angle γ. γ is shown to be about 40°. The value of about 40° is somewhat higher than the maximum amount of rotation of the apparatus shown in FIGS. 6 and 7, whose maximum amount of annular rotation is from between 20° and 30°. Referring next to FIG. 20, which shows an angle of rotation of magnetic gear 140 by an amount δ indicating the rotation to the end position marked by dotted line $D_2$. This amount of rotation is dictated by the abutment of raised portion 146 and rounded shell portion 148. Angle δ is measured from a perpendicular line marked CENTER extending from the center of spherical portion 132 when gears 138 and 140 are coplanar, and is about 40°, far in excess of the amount which would cause spherical portion 132 to contact magnetic gear 138 by the abutment of raised portion 146 and rounded shell portion 148.

In FIG. 20, magnetic gear 140 is shown as being tilted towards the viewer, with the axis of rotation extending from the plane of the paper towards the viewer and the other end of the axis extending to the rear of the paper. In FIG. 20, the angle of tilting is about 40°, as indicated in FIG. 20A. Magnetic gear 140 has a curved periphery indicated by the letter R which does not intersect or become tangent to magnetic gear 138. A clearance, indicated by the letter C between the peripheries of magnetic gears 138 and 140 is sufficient to enable the pivoting of gears 138 and 140 while the magnetic linkage between the respective peripheral magnets of gears 138 and 140 is sufficient to enable magnetic rotation of driven magnetic gear 140 relative to driving magnetic gear 138.

Figure 21:
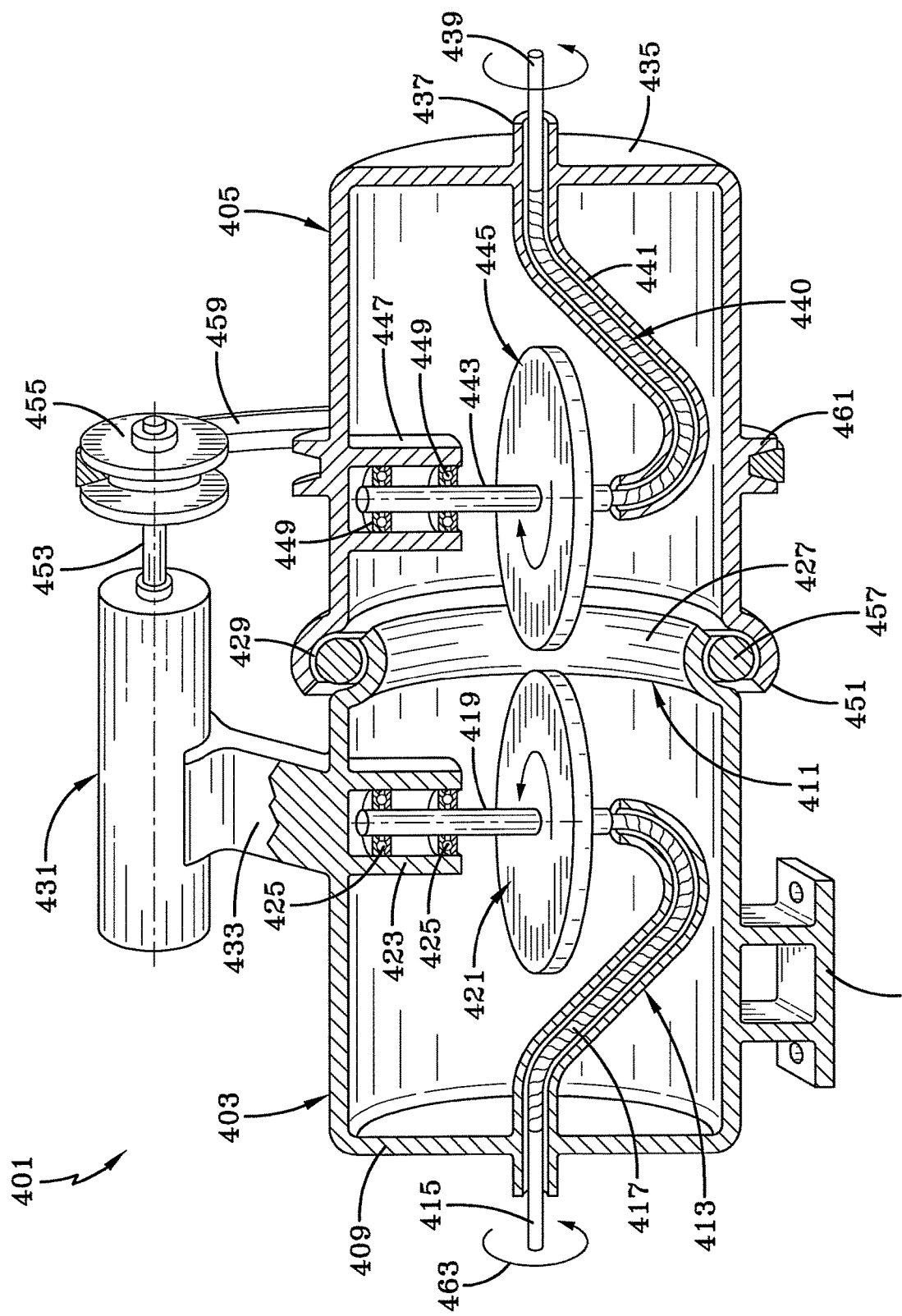
FIG. 21 is a pictorial perspective view of a gearbox for magnetic gears according to an embodiment of the invention.

Another embodiment of the invention is shown in FIG. 21. This embodiment shows how two magnetic gears can be manipulated to result in an output reversal without changing the magnetic properties of either magnetic gear. Referring to FIG. 21, a gearbox 401 includes a fixed gearbox portion 403 and a rotatable gearbox portion 405. Fixed gearbox portion 403 has a mounting foot 407 which holds fixed gearbox portion 403 in a fixed position when mounting foot 407 is attached to a support. Fixed gearbox portion 403 has a closed end 409 and an open end portion 411. Fixed gearbox portion 403 is shown as having a partial tubular casing 413 for receiving a rotatable input shaft 415. Input shaft 415 has a rotatable flexible input shaft 417 from which extends a rotatable output shaft 419 at the opposite end of rotatable flexible input shaft 417 from input shaft 415. Rotatable output shaft 419 extends from a rotatable magnetic gear 421. A tubular portion 423, which is a fixed part of fixed gearbox portion 403 incorporates gear shaft bearings 425 inside tubular portion 423 to enable the low friction rotation of rotatable output shaft 419. An annular, concave, semi-cylindrical, outwardly-facing inner portion 427 of a channel 429 is at the inner portion of open end portion 411 of fixed gearbox portion 403, whose purpose will be described below. A rotational drive mechanism 431 is fixed to a radially extending arm 433 fixed to fixed gearbox portion 403, and thus is located outwardly of gearbox 401.

Rotatable gearbox portion 405 of gearbox 401 is free to rotate. Rotatable gearbox portion 405 has a closed end 435. A fixed tubular casing 437 extends outwardly from closed end 435, and though which extends a rotatable output shaft 439. Output shaft 439 is connected to a flexible shaft 440 extending through a casing 441, which converts back to a rotatable shaft 443. Shaft 443 is affixed to a magnetic gear 445; shaft 443 has a longitudinal axis which is also the axis of rotation of magnetic gear 445. A tube 447 extends inwardly from the wall of rotatable gearbox portion 405, tube 447 being perpendicular to the longitudinal axis of gearbox 401. Tube 447 includes gear shaft bearings 449 for enabling the low friction rotation of shaft 443. An annular, convex, semi-cylindrical, inwardly-facing outer portion 451 of channel 429 to define channel 429 with outwardly facing inner portion 427.

Rotatable drive mechanism 431 has a drive shaft 453 to which is fixed to a rotatable pulley 455. A bearing 457 is located in channel 429 to reduce the friction between fixed gearbox portion 403 and rotatable gearbox portion 405.

Various devices can be used for assisting in performing the rotating function, such as but not limited to a V-belt 459 extending partially around pulley 455 and partially around an annular V-belt channel 461 extending around the peripheral end of rotatable gearbox portion 405 proximal fixed gearbox portion 403 for receiving a portion of V-belt 459.

In operation, a shaft drive mechanism rotates input shaft 415 in a direction indicated by arrow 463. Arrow 463 is shown rotating in the clockwise direction when viewed towards gearbox 401. The rotation of input shaft 415 causes the same rotation of rotatable flexible input shaft 417, which in turn causes the same rotation of rotatable output shaft 419 and magnetic gear 421 to which rotatable output shaft 419 is fixed. This rotation effects the reverse rotation of magnetic gear 445 which causes the same rotation of flexible shaft 440, resulting in a clockwise (as viewed from the inside of closed end 435) rotation of output shaft 439. Thus, in this configuration, the input and output shafts 415, 439 act as if they were one solid shaft. If rotational drive mechanism 431 rotates drive shaft 453 and pulley 455, V-belt 450 is driven to rotate rotatable gearbox portion 405 by 180°. Magnetic gear 445 is made to rotate in the opposite direction when sequential magnetic interaction is re-established and output shaft 439 similarly reverses its rotation. When viewed towards gearbox 401, input shaft 415 rotates clockwise and the output shaft 439 rotates counterclockwise. Any other means may be used to rotate rotatable gearbox portion 405 and effect output shaft reversal.

The transport aspects of the present invention are free of gear lubricant, and if electrically driven, does not require the use of petroleum or other lubricants except in the bearings, and flexible drive shafts greatly reduce the harm to the environment. There is expected to be low frictional wear and tear on the system as compared to those systems presently in use, even the flexible drive shafts can be replaced by sets of magnetic gears so that the entire gearbox may use sealed, lubricated for life shaft bearings.

Many of the magnetic components described herein are permanent magnets. In some instances, electro-magnets could be used as well.

Figures 22, 22A:
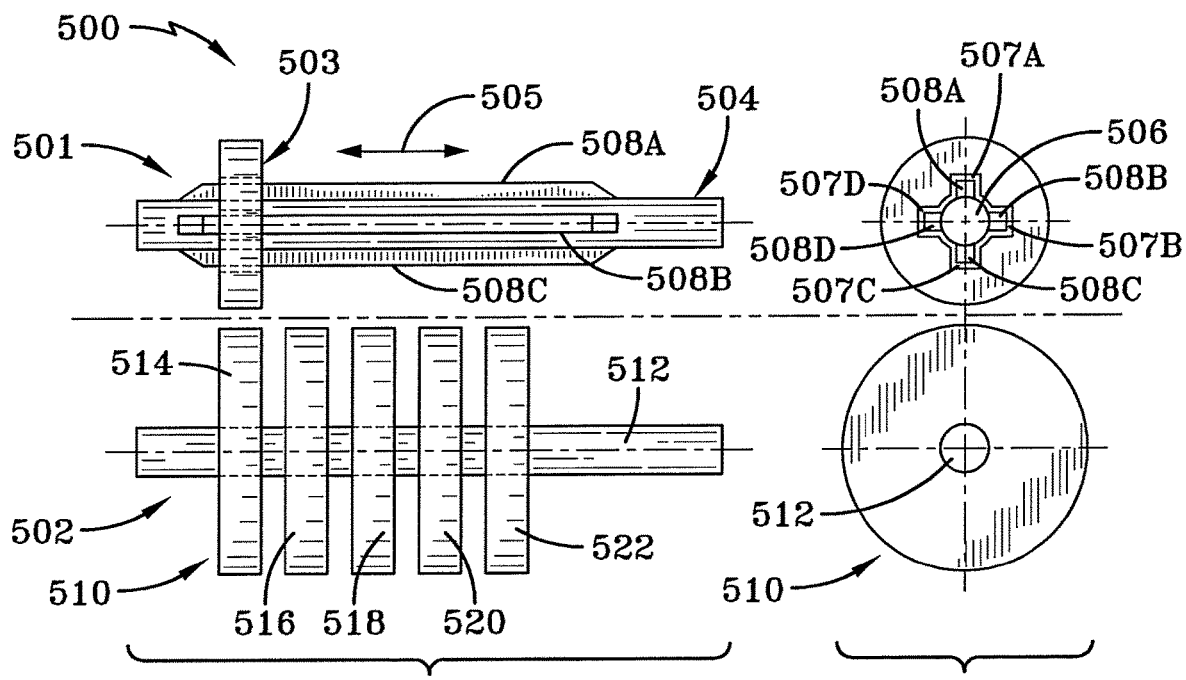
FIG. 22 is a schematic view of a magnetic gearbox in which one magnetic gear is irrotatively mounted on one gear shaft and a set of magnetic gears is rotatively mounted on a second gear shaft parallel to the one gear shaft. The gears mounted on either shaft could be the driving gear and those mounted on the other shaft could be the driven gears.
FIG. 22A is an end view of the device shown in FIG. 22.

Another embodiment of the present invention relates to the provision of a magnetic gearbox in which one magnetic gear, which is in this case selected to be the driving gear moves along a path defined by an axle on which the driven gear is irrotational. A set of second magnetic gears are irrotationally located on a second axle where the second magnetic gears are selected to be the driven gears. The driving gear is in magnetically sequential interaction with the respective driven gears. That is, there is sequential interaction between the north and south poles of the driving gear and the respective driven gears. The driving gear is respectively coplanar with the driven gears. The pitch between the poles of the driven magnetic gear can be designated by x, and the pitch between the magnetic poles of the driven gear can extend from $(x+\Delta)$ to $(x-\Delta)$, where $(\Delta)$ is an incremental value beyond which adequate sequential magnetic interaction is lost. One embodiment using this form of the invention is shown in FIG. 22. A gearbox 500 is shown, having cooperating magnetic gear systems 501 and 502 in which one magnetic gear system 501 or 502 is the driving magnetic gear system and the other is the driven magnetic gear system. A magnetic gear 503 is mounted on a splined shaft 504. Magnetic gear 503 has a central opening 506 shown in FIG. 22A, and has radially extending openings 507A, 507B, 507C and 507D extending from central opening 506 for receiving respectively splines 508A 508B, 508C and 508D which prevent magnetic gear 503 from rotating with respect to shaft 504. Shaft 504 and splines 508A-508D are linear along their respective lengths, so magnetic gear 503 moves linearly along shaft 504 in the directions shown by arrow 505. Arrow 505 is furthermore a schematic representation of a first magnetic gear moving device for operatively connecting with the first magnetic gear 503 and moving the first magnetic gear 503 in sequence to the respective magnetic gears 514, 516, 518, 520 and 522 of the set of magnetic gears 510. Magnetic gear 503 is constructed as were the magnetic gears discussed previously herein, and have adjacent poles of alternating polarity. Magnetic gear 503 could be a driving gear or a driven gear. If magnetic gear 503 were a driving gear, apparatus would be required for rotating splined shaft 504 around its longitudinal axis.

Figures 23, 23A:
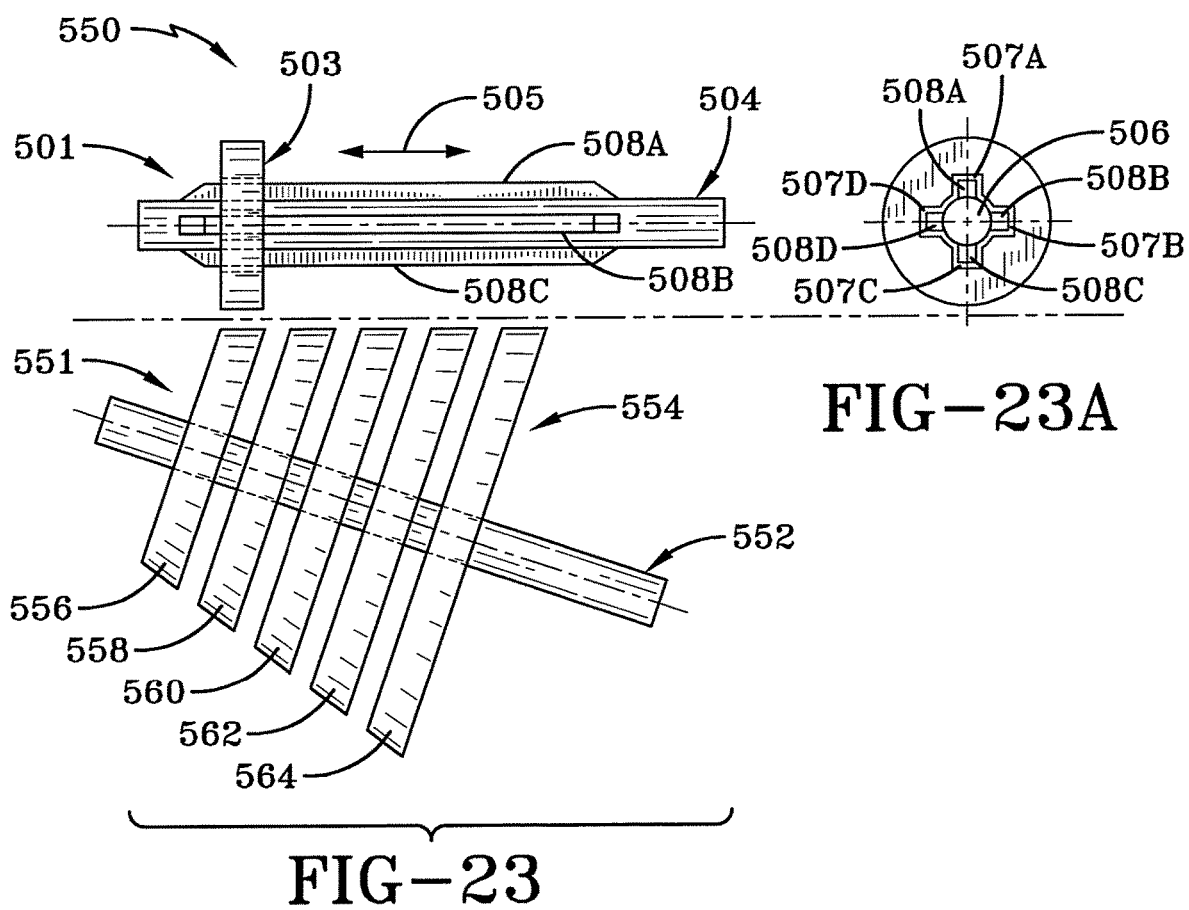
FIG. 23 is a schematic view of an embodiment similar to that shown in FIG. 23 where the respective shafts are not parallel.
FIG. 23A is an end view of the device shown in FIG. 24.

A set of driven magnetic gears 510 (assuming magnetic gear system 501 is the driving gear) of the same diameter is mounted irrotationally on a shaft 512 which is linear and parallel to shaft 504. Set of driven magnetic gears 510 of magnetic gears could be driven gears or driving gears. If set of driven magnetic gears 510 were driving gears, apparatus would have to be provided for rotating the respective gears of set of driven magnetic gears 510 and the shaft 512. In the discussion to follow, magnetic gear system 501 is selected as the driving gear system and magnetic gear system 502 is selected as the driven gear system. Set of magnetic driven gears 510 is shown as being five in number, and designated as driven magnetic gears 514, 516, 518, 520 and 522. Each of driven magnetic gears 514, 516, 518, 520 and 522 are of the same diameter, and are separated from each other by a distance that does not affect significantly the adjacent gears when the respective gears are magnetically engaged (i.e. in magnetically sequential interaction) by the driving magnetic gear. Driven magnetic gear 518 is the center of set of driven magnetic gears 510 and has a pitch between the poles which is either close to or equal to the pitch of magnetic gear 503. The pitch of driven magnetic gears 516 and 514 have pitches that are increasingly less than the pitch of driven magnetic gear 518, and the pitch of driven magnetic gears 520 and 522 increases sequentially from the pitch of driven magnetic gear 518. The respective pitches must be such that they maintain sequential magnetic interaction to transmit the power required without slippage when any gear pair is selected. Therefore, when magnetic gear 503 is in magnetic interaction with driven magnetic gear 514, and magnetic gear 503 moves sequentially from driven magnetic gear 514 to driven magnetic gear 522, magnetic gear 503 will increase the rotational speed of set of driven gears 510 as magnetic gear 503 moves sequentially to the right when driven magnetic gear 522 and shaft 512 attains the maximum rotational speed.

Where a large range of ratios is desired, the driving and driven shafts can be made non-parallel but coplanar (or nearly so), all the while maintaining the sequential magnetic interaction to transmit the power required, and the diameters of the respective magnetic gears fixed to the shaft increases so as to be enveloped within a conical surface of rotation. Referring to FIG. 23, a magnetic gearbox 550 is shown. The same magnetic gear system 501 that appeared in FIG. 22 is likewise shown in FIG. 23. Each of the components of magnetic gear system 501 are given the same numbers as those in FIG. 22, and reference is made to a description thereof as set forth above. A magnetic gear system 551 is also part of magnetic gearbox 550.

A driven magnetic gear shaft 552 is shown in FIG. 23 which is not parallel with magnetic gear shaft 504. In the following description, a set of driven magnetic gears 554 is shown as being rotatable with driven magnetic gear shaft 552 on which set of driven magnetic gears 554 are irrotational. In the present description, set of driven magnetic gears 554 are assumed to be the driven gear set. Set of driven magnetic gears 554 are sequentially mounted on driven magnetic gear shaft 552 and are of increasing diameter shown respectively as driven magnetic gears 556, 558, 560, 562 and 564. Respective driven magnetic gears 556, 558, 560, 562 and 564 all maintain the sequential magnetic interaction with magnetic gear 503 to transmit the power required. The pitch of the poles on the respective magnetic gears forming a part of set of driven magnetic gears 554 may be equal to the pitch of driven magnetic gear system 502 or anywhere within their respective capabilities while maintaining sequential magnetic interaction. Unlike the pitch of the poles of set of magnetic gears 510 where shafts 504 and 512 are parallel, the pitch of the poles of center driven magnetic gear 560 need not be equal or nearly so to the pitch of poles of magnetic gear 503. Magnetic gear 503 must be shifted between the respective gears in set of driven magnetic gears 554 of magnetic gears on shaft 552 in FIG. 23.

Figure 24:
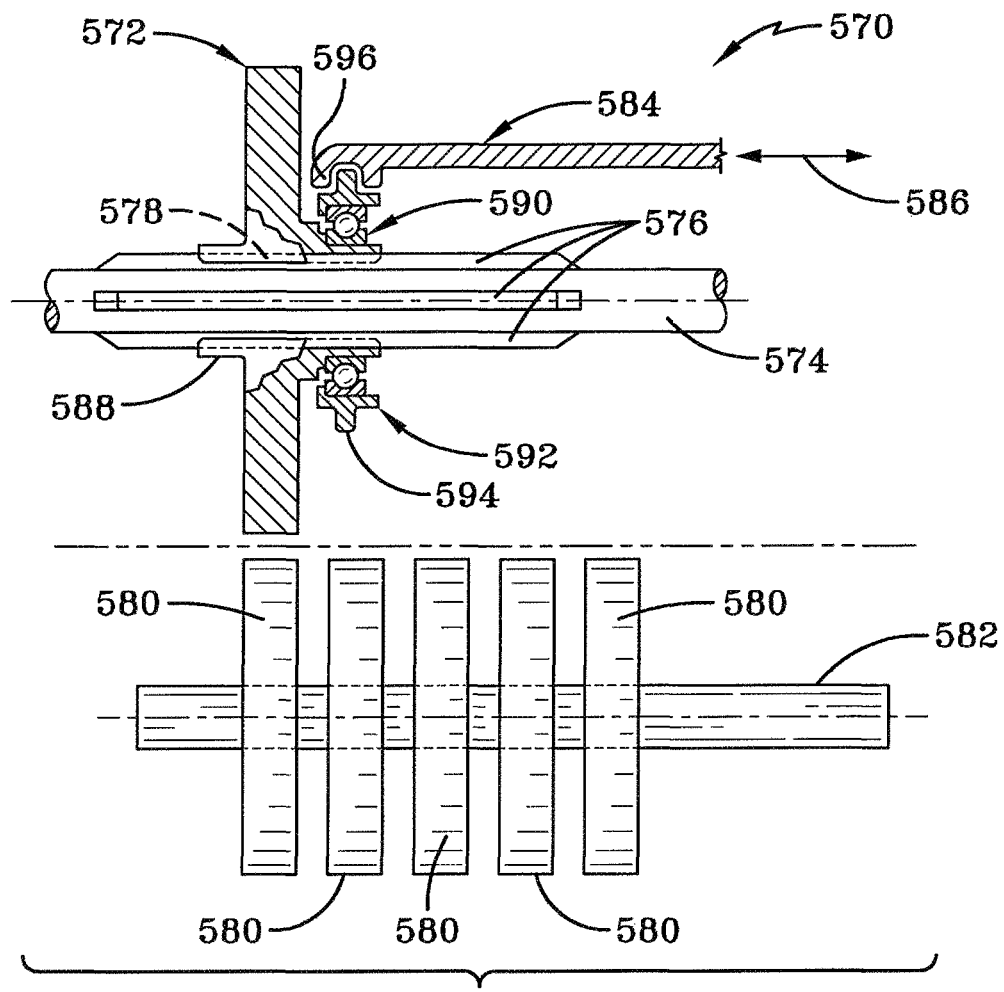
FIG. 24 is schematic side view of a gearbox similar to that shown in FIG. 23 and further indicating a shifting mechanism for shifting the magnetic gear on one of the shafts.

A shifter assembly 570 is shown in FIG. 24. FIG. 24 has a magnetic gear 572 corresponding to magnetic gear 503 in FIGS. 22 and 23. Magnetic gear 572 is mounted on a cylindrical shaft 574 having a set of splines 576 extending through respective slots 578 in magnetic gear 572 to prevent the rotation of magnetic gear 572 on shaft 574. A set of magnetic gears 580 extend from a shaft 582 and are rotated as a result of the sequential magnetic interaction between magnetic gear 572 and the respective gears forming set of magnet gears 580. A shifter 584 is movable in a direction parallel with the longitudinal axis of shaft 574 as indicated by arrow 586. Magnetic gear 572 has a generally cylindrical flange 588 in which respective slots 578 are located for receiving respective splines 576. Flange 588 is an annular tube holding an annular member 590. An annular member 592 is connected to the outer wall of annular member 590, and annular member 592 has an upstanding, annular vertical wall 594 which is parallel to magnetic gear 572, and perpendicular to the longitudinal axis of shaft 574 which is used to move magnetic gear 572 along shaft 574.

Shifter 584 has an inverted, "U"-shaped end portion 596 for receiving upstanding, annular vertical wall 594. An appropriate device is provided for moving shifter 584 linearly as indicated by arrow 586 to move magnetic gear 572 along shaft 574 to put magnetic gear 572 in sequential magnetic interaction with the respective gears of set of magnetic gears 580. If magnetic gear 572 is the driving gear, it would move sequentially across the set of magnetic gears 580 to increase or decrease their respective rotational speeds.

The reversing and speed changing gearboxes may beneficially be combined.

Figure 25:
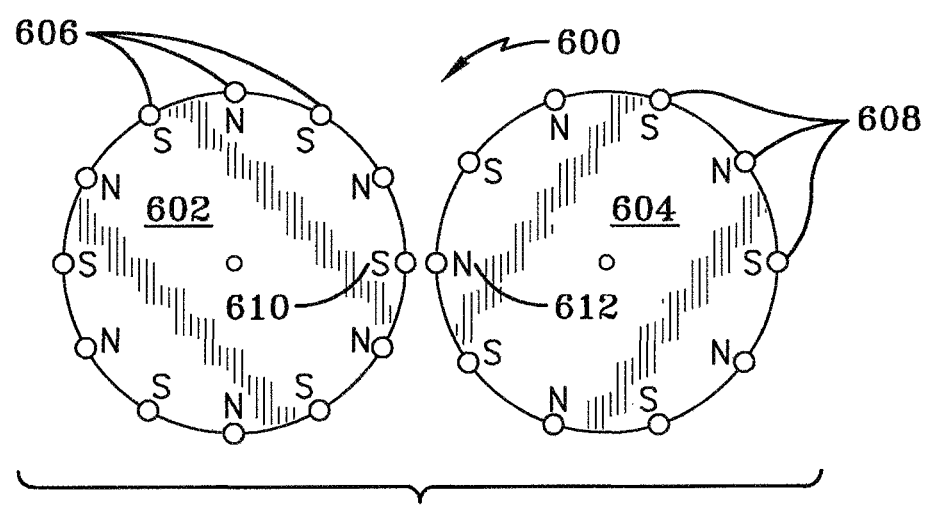
FIG. 25 is a schematic view of a pair of magnetic gears of equal size having unequal numbers of magnets on their respective peripheries.

FIG. 25 shows a gear train 600 having a pair of magnetic gears 602 and 604, having equal diameters but unequal numbers of peripheral magnets of alternating polarities. Magnetic gear 602 has a set of twelve peripheral magnets 606, and magnetic gear 604 has a set of ten peripheral magnets 608. A magnet 610 of magnetic gear 602 is magnetically linked with a magnet 612 on magnetic gear 604, since magnets 610 and 612 are at the point of tangency of the respective pitch circles of magnetic gears 602 and 604. If magnetic gear 602 is the drive magnetic gear, its constant rotational speed would effect a lower constant speed of magnetic gear 604. The reverse would be true if magnetic gear 604 were the drive magnetic gear.

It should be noted that a single magnetic gear may have the pitches between the poles varying around the periphery of the magnetic gear, and the mating magnetic gear may have the pitch between its poles varying as well, or the poles could be uniformly equal, so long as the sequential magnetic interaction is maintained. For a constant rotational speed input, this would yield rotational speed variations at the output for a constant input speed.

When sequential magnetic interaction is maintained (i.e. in the vicinity of the point of closest approach between the magnetic gears where the magnetic poles of one magnetic gear sequentially attractively interacts with the magnetic poles of the other magnetic gear), the maintenance of equal circumferential separation of alternating magnetic poles is the norm in both magnetic gears. However, since only the non-physical magnetic fields of the gears are interacting, it has not been previously recognized that maintenance of equal circumferential separation of alternating magnetic poles is not an absolute requirement.

Indeed, so long as sequential magnetic interaction of the gears is maintained, and this is dependent on many factors such as angular separation of magnetic poles around the gear, in the case of two gears of the same diameter, if the circumferential separation of alternating magnetic poles of one gear is kept constant, the other's circumferential separation of alternating magnetic poles can be higher or lower than the first.

With this novel arrangement, it becomes possible to have a gear ratio different from the ratio of the diameters of the two magnetic gears and all the other normal modes of interaction previously described will continue to operate.

There is also an unusual configuration that also can occur as a consequence. This is when the circumferential separation of magnetic poles around the circumference varies around one magnetic gear's periphery. If the other magnetic gear has equal circumferential separation, for a constant input speed, this would cause the output to speed up and slow down as the circumferential separations between the magnetic poles vary.

The invention has been described in detail, with particular to reference to the preferred embodiments thereof, but variations and modifications within the spirit and scope of the invention may appear to those skilled in the art to which the invention pertains.

The invention claimed is:

1. A gearbox for magnetic gears, said gearbox comprising:
   a first shaft having a longitudinal axis;
   a first magnetic gear shiftable along said first shaft, said first magnetic gear being irrotational on said first shaft;
   a second shaft having a longitudinal axis, said first shaft and said second shaft being coplanar and non-parallel;
   a set of magnetic gears mounted on said second shaft, said set of magnetic gears being irrotatable on said second shaft and not being shiftable along said second shaft, and wherein said set of magnetic gears on said second shaft have respective peripheries, said respective peripheries of said set of magnetic gears on said second shaft are enveloped within a conical surface of rotation, and said respective peripheries are in sequence generally tangent and in magnetic interaction with the periphery of said first magnetic gear on said first shaft;
   said first magnetic gear being shiftable along said first shaft to be in sequential magnetic interaction with said set of magnetic gears on said second shaft, wherein one of said first magnetic gear and said set of magnetic gears being initially rotatable at a rotational speed, and effecting the sequential increasing or decreasing rotational speed of adjacent magnetic gears of said set of magnetic gears on said second shaft as said first magnetic gear is shifted along said first shaft and being in sequential magnetic interaction with said respective magnetic gears in said set of magnetic gears on said second shaft.

2. A gearbox according to claim 1 wherein said first shaft and said second shaft are parallel and said set of magnetic gears on said second shaft having equal diameters.

3. A gearbox for magnetic gears according to claim 1 and further comprising a first magnetic gear linear moving device for operatively connecting with said first magnetic gear and moving said first magnetic gear in sequence to the respective magnetic gears of said set of magnetic gears.

4. A gearbox for magnetic gears, said gearbox comprising:
   a first shaft having a longitudinal axis;
   a first magnetic gear mounted on said first shaft, said first magnetic gear being irrotational on said first shaft and being rotatable with said first shaft, said first shaft and said first magnetic gear being movable in a linear direction along said longitudinal axis;
   a second shaft having a longitudinal axis;
   a set of magnetic gears mounted on said second shaft, said set of magnetic gears being fixed and irrotatable on said second shaft;
   wherein said first shaft and said second shaft are coplanar and non-parallel, and wherein said set of magnetic gears on said second shaft being of sequentially increasing diameters and have respective peripheries, said respective peripheries lying within a conical surface of rotation and being sequentially tangent to each other; and
   said first magnetic gear being shiftable along said first shaft to be in sequential magnetic interaction with the respective peripheries of said set of magnetic gears on said second shaft, wherein one of said first magnetic gear and said set of magnetic gears on said second shaft being initially rotatable at a rotational speed, and effecting the sequential increasing or decreasing rotational speed of adjacent magnetic gears of said set of magnetic gears on said second shaft as said first magnetic gear is shifted along said first shaft and being in sequential magnetic interaction with said respective magnetic gears in said set of magnetic gears on said second shaft.

5. A gearbox according to claim 4 wherein there is sequential interaction between the periphery of said gear on said first shaft with the periphery of said respective gears on said second shaft, wherein the respective pitches of said set of said respective gears on said second shaft are alternatively equal or unequal to the pitch of said first magnetic gear on said first shaft.

6. A gearbox for magnetic gears according to claim 4 and further including a first magnetic gear linear moving device for operatively connecting with said first magnetic gear and moving said first magnetic gear in sequence to the respective magnetic gears of said set of magnetic gears on said second shaft.

7. A gearbox for magnetic gears, said gearbox comprising:
   a first shaft having a longitudinal axis;
   a first magnetic gear mounted on said first shaft, said first magnetic gear being irrotational on said first shaft and being rotatable with said first shaft, said first shaft and said first magnetic gear being movable in a linear direction along said longitudinal axis;
   a second shaft having a longitudinal axis;
   a set of magnetic gears mounted on said second shaft, said set of magnetic gears being fixed and irrotatable on said second shaft;

wherein said first shaft and said second shaft are coplanar and parallel, and wherein said set of magnetic gears on said second shaft being of equal diameters; and said first magnetic gear being shiftable along said first shaft to be in sequential magnetic interaction with the respective peripheries of said set of magnetic gears on said second shaft, wherein one of said first magnetic gear and said set of magnetic gears on said second shaft being initially rotatable at a rotational speed, and effecting the sequential increasing or decreasing rotational speed of adjacent magnetic gears of said set of magnetic gears on said second shaft as said first magnetic gear is shifted along said first shaft and being in sequential magnetic interaction with said respective magnetic gears in said set of magnetic gears on said second shaft.

8. A gearbox according to claim 7 wherein there is sequential interaction between the periphery of said gear on said first shaft with the periphery of said respective gears on said second shaft, wherein the respective pitches of said set of said respective gears on said second shaft are alternatively equal or unequal to the pitch of said first magnetic gear on said first shaft.

9. A gearbox for magnetic gears according to claim 8 and further including a first magnetic gear linear moving device for operatively connecting with said first magnetic gear and moving said first magnetic gear in sequence to the respective magnetic gears of said set of magnetic gears on said second shaft.

10. A gearbox for magnetic gears, said gearbox comprising:
a first shaft having a longitudinal axis;
a first magnetic gear shiftable along said first shaft, said first magnetic gear being irrotational on said first shaft;
a second shaft having a longitudinal axis;
a set of magnetic gears mounted on said second shaft, said set of magnetic gears being irrotatable on said second shaft and not being shiftable along said second shaft, each of said set of magnetic gears being in form of a disc;
said first magnetic gear being shiftable along said first shaft to be in sequential magnetic interaction with said set of magnetic gears on said second shaft, wherein one of said first magnetic gear and said set of magnetic gears being initially rotatable at a rotational speed, and effecting the sequential increasing or decreasing rotational speed of adjacent magnetic gears of said set of magnetic gears on said second shaft as said first magnetic gear is shifted along said first shaft and being in sequential magnetic interaction with said respective magnetic gears in said set of magnetic gears on said second shaft.

11. A gearbox according to claim 10 wherein said first shaft and said second shaft are parallel and said set of magnetic gears on said second shaft having equal diameters.

12. A gearbox according to claim 10 wherein said first shaft and said second shaft are coplanar and non-parallel, and wherein said set of magnetic gears on said second shaft have respective peripheries are enveloped within a conical surface of rotation, and are in sequence generally tangent and in magnetic interaction with the periphery of said first magnetic gear on said first shaft.

13. A gearbox for magnetic gears according to claim 10 and further comprising a first magnetic gear linear moving device for operatively connecting with said first magnetic gear and moving said first magnetic gear in sequence to the respective magnetic gears of said set of magnetic gears.

* * * * *